US005257325A

United States Patent [19]

Casparian et al.

[11] Patent Number: 5,257,325
[45] Date of Patent: Oct. 26, 1993

[54] ELECTRONIC PARALLEL RASTER DUAL IMAGE REGISTRATION DEVICE

[75] Inventors: Mark A. Casparian, Poughkeepsie; Donald C. Forslund, Wappingers Falls, both of N.Y.

[73] Assignee: International Business Machines Corporation, Armonk, N.Y.

[21] Appl. No.: 806,944

[22] Filed: Dec. 11, 1991

[51] Int. Cl.$^5$ ............................................. G06K 9/32
[52] U.S. Cl. ......................................... 382/44; 382/45; 382/46; 395/138
[58] Field of Search .................. 382/44, 45, 46, 42, 382/30; 340/727; 395/137, 138

[56] References Cited

U.S. PATENT DOCUMENTS

| | | | |
|---|---|---|---|
| 3,905,045 | 9/1975 | Nickel | 382/42 |
| 4,136,332 | 1/1979 | Kadota et al. | 382/45 |
| 4,164,728 | 8/1979 | Marsh | 382/44 |
| 4,197,584 | 4/1980 | Blazek | 364/419 |
| 4,200,861 | 4/1980 | Hubach et al. | 382/30 |
| 4,308,523 | 12/1981 | Schapia | 382/45 |
| 4,347,001 | 8/1982 | Levy et al. | 356/398 |
| 4,370,641 | 1/1983 | Kantor et al. | 340/146.3 H |
| 4,389,669 | 6/1983 | Epstein et al. | 358/101 |
| 4,427,332 | 1/1984 | Manriquez | 414/331 |
| 4,448,532 | 5/1984 | Joseph et al. | 356/394 |
| 4,475,122 | 10/1984 | Green | 358/101 |
| 4,507,605 | 3/1985 | Geisel | 324/73 PC |
| 4,509,075 | 4/1985 | Simms et al. | 358/106 |
| 4,511,242 | 4/1985 | Ashbee et al. | 355/14 C |
| 4,521,807 | 6/1985 | Werson | 358/106 |
| 4,532,723 | 8/1985 | Kellie et al. | 356/73 |
| 4,547,800 | 10/1985 | Masaki | 382/30 |
| 4,556,317 | 12/1985 | Sandland et al. | 356/237 |
| 4,570,180 | 2/1986 | Baier et al. | 358/106 |
| 4,616,333 | 10/1986 | Shimoni | 364/417 |
| 4,630,114 | 12/1986 | Bergmann et al. | 358/136 |
| 4,736,437 | 4/1988 | Sacks et al. | 382/44 |
| 5,164,997 | 11/1992 | Kumagai | 382/44 |
| 5,170,441 | 12/1992 | Mimura et al. | 382/45 |

Primary Examiner—Michael T. Razavi
Assistant Examiner—David Fox
Attorney, Agent, or Firm—Whitham & Marhoefer

[57] ABSTRACT

An apparatus and method electronically registers or aligns ideal raster data to real raster data for subsequent processes such as inspection systems and image processing systems. The electronic image registration system receives ideal and real images in scrolling buffers wide enough to hold the width of the image and high enough to hold the difference in a skewed image. In other words, the real and ideal upper corners must be contained within the buffers for any possible kind of misalignment or distortion. Each buffer has a selector to randomly access frames of image in the vertical direction. Each buffer image frame is moved horizontally out of its lower swath and into its new position in the next upper swath. Horizontal movement of each buffer is independent, such that adjustable sequential access in the horizontal direction is available. The real image stream buffer selector addressing and clocking are held fixed during the registration phase, while the ideal image stream buffer selector address and clocking are in constant adjustment.

19 Claims, 40 Drawing Sheets

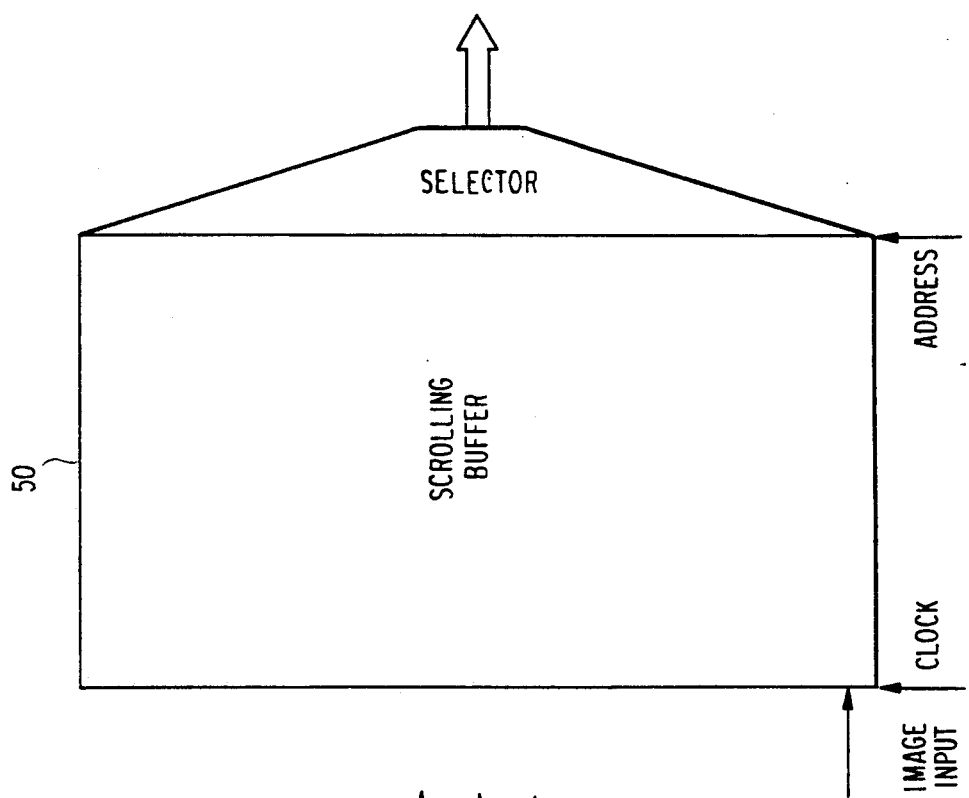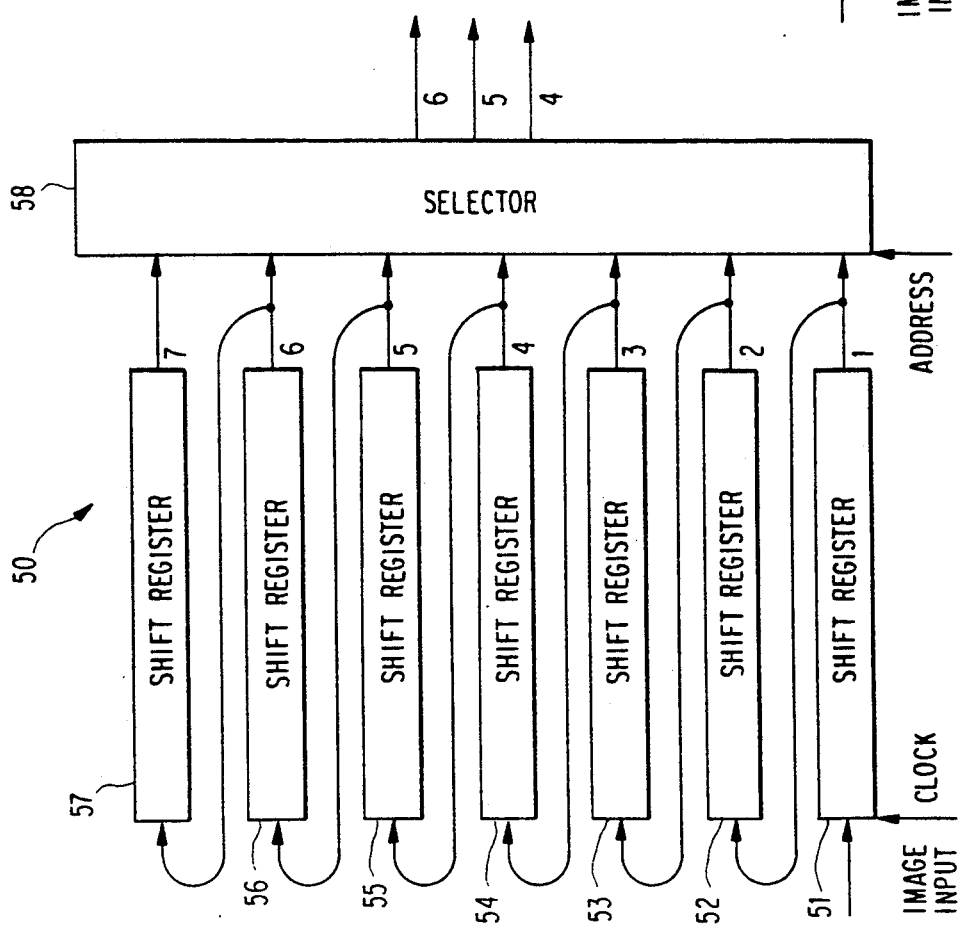

FIG. 14A
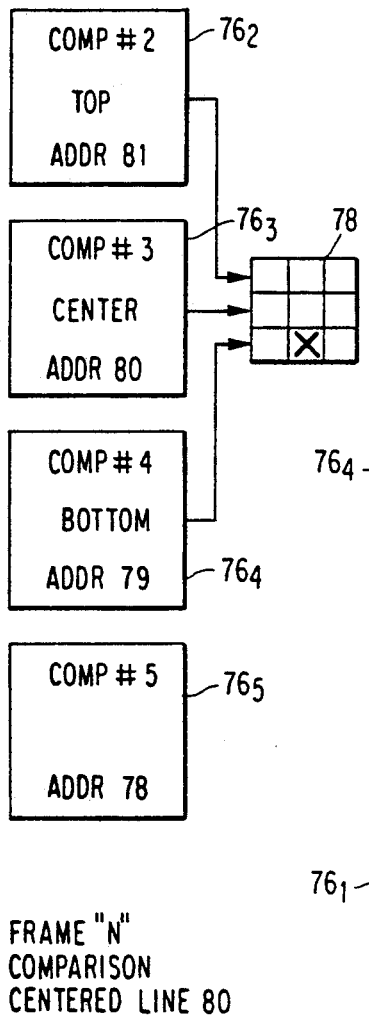
FRAME "N"
COMPARISON
CENTERED LINE 80
FIG. 14B
FIG. 14C
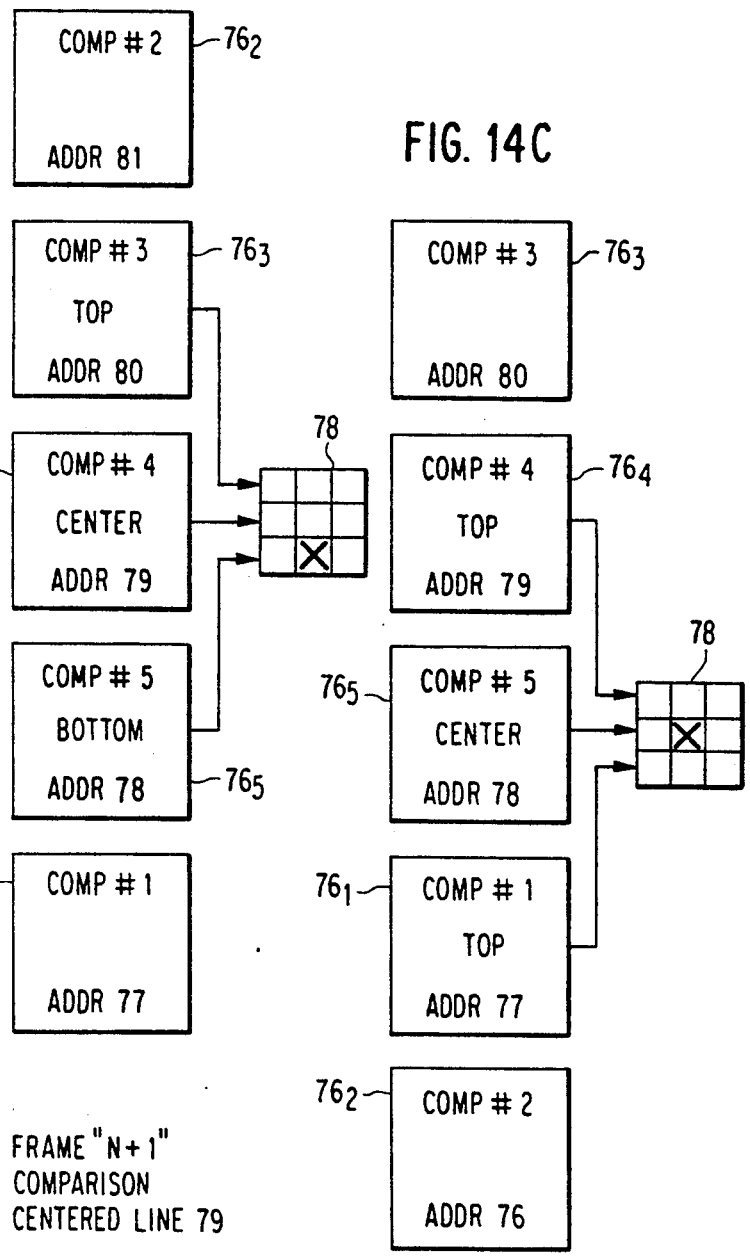
FRAME "N+1"
COMPARISON
CENTERED LINE 79
FRAME "N+2"
COMPARISON
CENTERED LINE 78

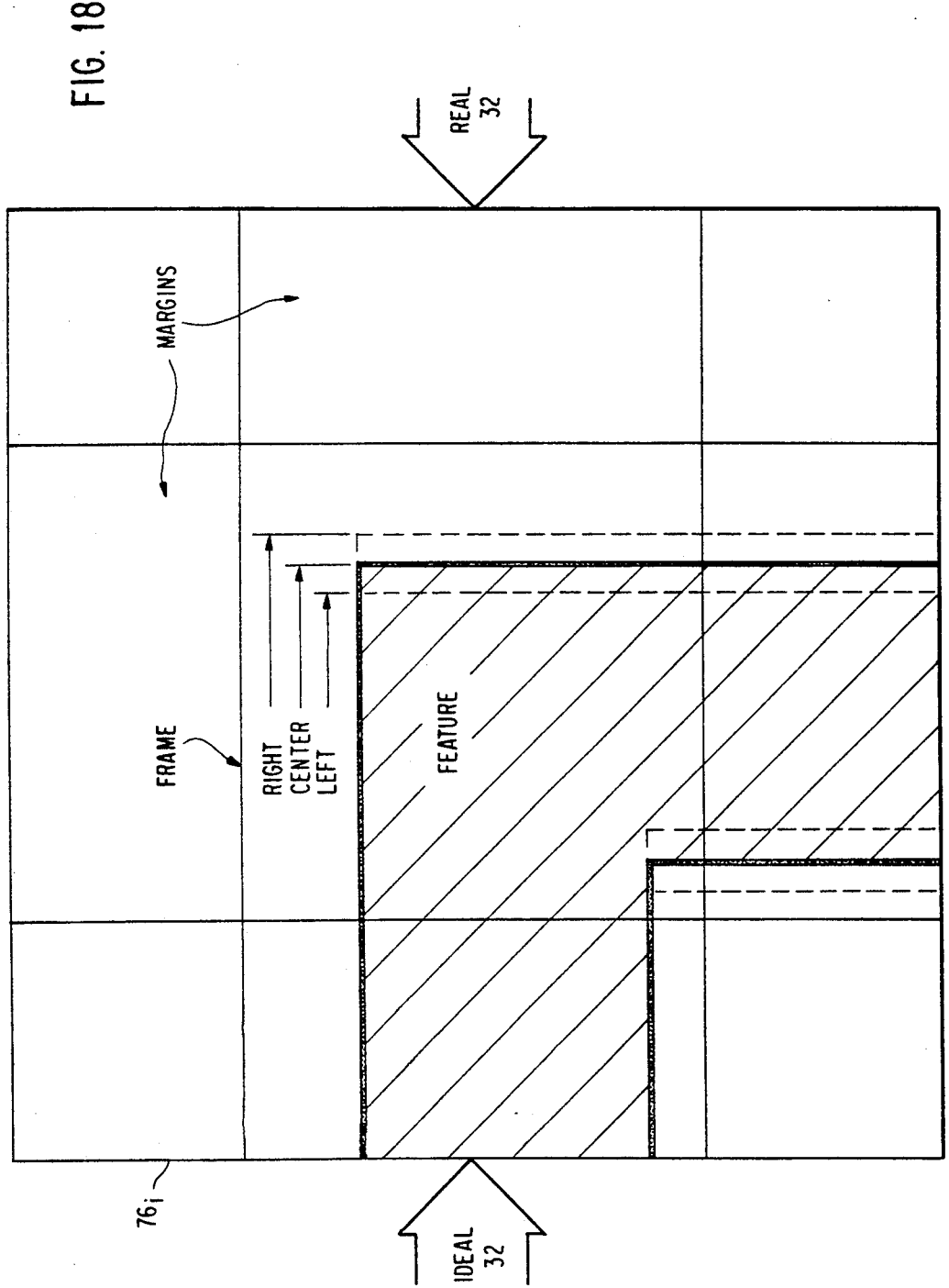

FIG. 22
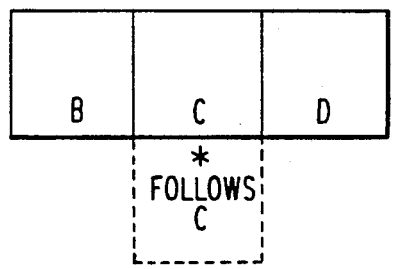
RULE: "NEW FRAME FOLLOWS FRAME ABOVE"
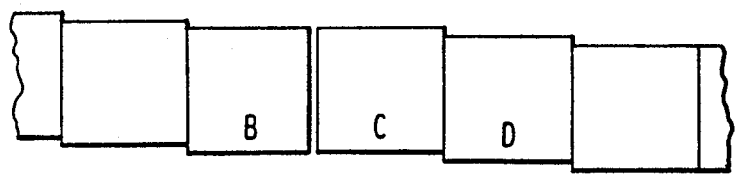
HISTORY MAP CONTENTS
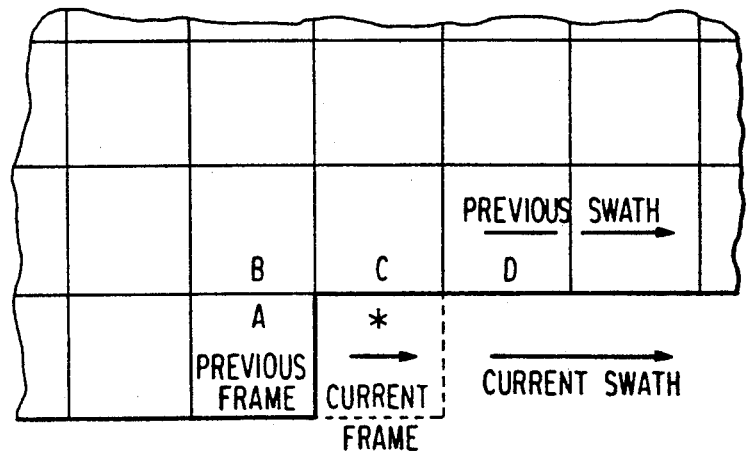
SCAN IMAGE REGULAR FRAMEWORK
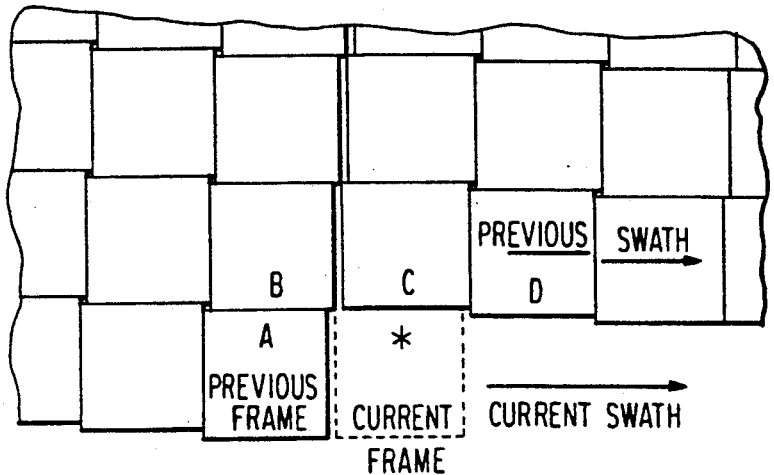
FRAMES PICKED FROM REFERENCE IMAGE ACCORDING TO RULE AND HISTORY MAP

SEVERAL OF THE 512 POSSIBLE BEST COMBINATIONS

FIG. 33

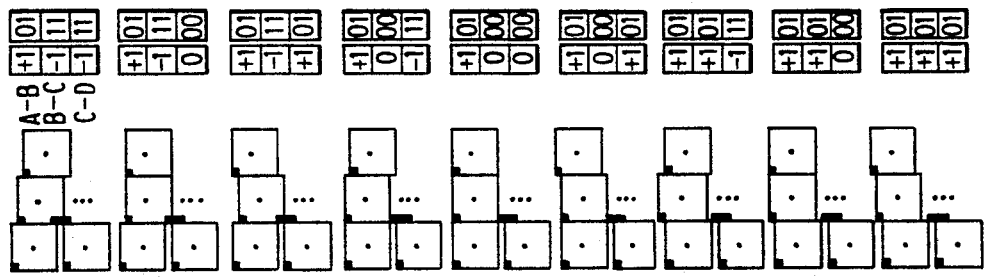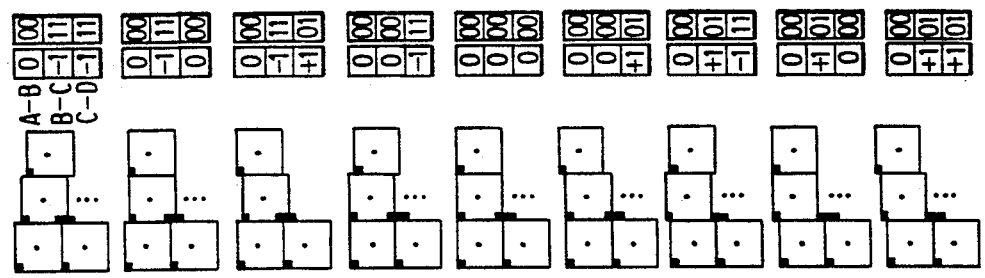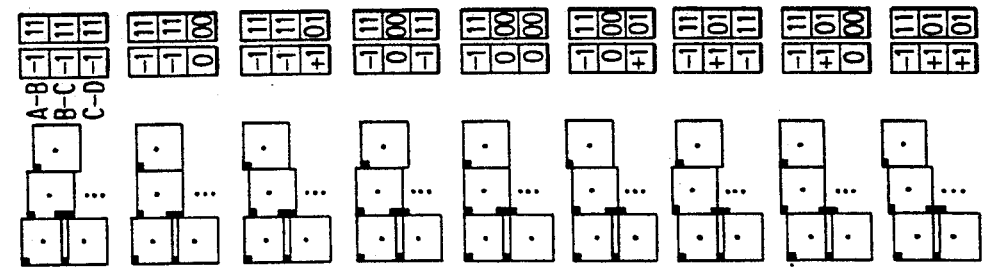
FIG. 39

FIG. 40
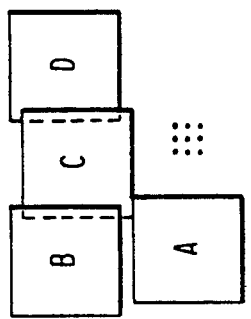
EXAMPLE 1
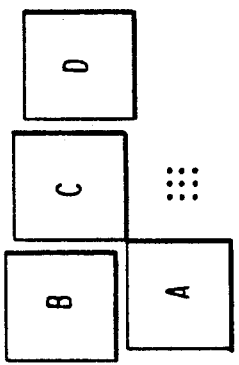
EXAMPLE 2
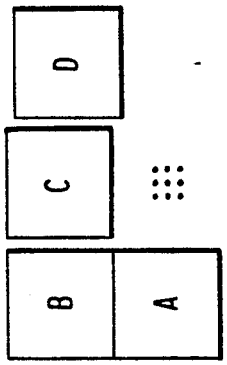
EXAMPLE 3

FRAME SELECTION PRIORITY MATRIX

ELECTRONIC PARALLEL RASTER DUAL IMAGE REGISTRATION DEVICE

CROSS-REFERENCE TO RELATED APPLICATION

The subject invention is related to the invention disclosed in co-pending patent application Ser. No. 07/806,942 filed concurrently herewith by Donald C. Forslund for "Advanced Manufacturing Inspection System". The disclosure of application Ser. No. 07/806,942 is incorporated herein by reference.

DESCRIPTION

BACKGROUND OF THE INVENTION

1. Field of the Invention

The present invention generally relates to image processors for performing spatial and temporal alignment of two or more topologically similar rasterized images and, more particularly, to image processors of the type for use in subsequent processes such as the inspection system defect detection system described in application Ser. No. 07/806,942.

2. Statement of the Problem

Image processing as practiced in the area of printed circuit board inspection generally operates upon images generated as a raster of picture elements (pixels) by devices such as laser scanners, vidicons and linear charge-coupled device (CCD) arrays. Those pixels are converted from an analog form to a binary form for further processing. That processing is upon small sections of large fields of image data because it is more economical to operate on the directly acquired data than it is to store it for use by another method of processing.

3. Description of the Prior Art

While the translation and rotation of the real image might be corrected by mechanically rotating and translating the real object prior to the raster scanning acquisition of data, mechanical translation and rotation adjustments are of limited value when the mechanical precision is gross in comparison to the raster pixel resolution. As the image resolution is increased, mechanical precision must also be improved. When raster pixel resolution is measured in microinches, mechanical tolerances must be the same. A hostile environment (e.g., vacuum, temperature, inaccessibility, and vibration) may also preclude mechanical solutions. Magnification, minification, and distortion of the real image 20 may be produced by the raster scanning device 14' or by the original manufacture of the real object being imaged. These differences from the ideal are not amenable to compensation by mechanical or optical adjustments.

The prior art shows that parallel image processing is structured to operate identically on points in the image that are widely separated in the horizontal or vertical directions. No scheme exists in the prior art to process images in parallel by operating on their adjacent rasters.

SUMMARY OF THE INVENTION

It is therefore an object of the present invention to provide a way to electronically register or align the ideal raster data to the real raster data for subsequent processes such as inspection systems and defect detection systems.

According to the invention, there is provided an electronic image registration system which is a self-contained subsystem that can be imbedded in many other systems. The electronic image registration system receives ideal and real images in scrolling buffers wide enough to hold the width of the image and high enough to hold the difference in a skewed image. In other words, the real and ideal upper or lower corners must be contained within the buffers for any kind of misalignment or distortion. Each buffer image is moved horizontally out of its lower swath and into its new position in the next upper swath. Horizontal movement of each buffer is independent, such that adjustable sequential access in the horizontal direction is available.

Each buffer has a "selector" to randomly access the image in the vertical direction. The real image stream buffer selector addressing and clocking are held fixed during the registration phase, while the ideal image stream buffer selector address and clocking are in constant adjustment. The effect of this buffer clocking and selector addressing is to impose a new raster field direction upon the fixed ideal image which is identical to the fixed raster field applied to the misaligned real object image.

The invention is used in the advanced manufacturing inspection system described in copending application Ser. No. 07/806,942. That system includes a database containing a rasterized reference image of the product inspected at the inspection resolution. The full image is stored in the system database and is accessed and fed in a raster manner to the electronic registration subsystem which is the subject of this invention. The electronic registration subsystem aligns the reference data to the incoming thresholded product inspection data. The aligned reference and inspection data are driven to all the parallel defect detection channels. A classifier block selects the output of the desired channels for recording into the defect memory.

In an alternative embodiment disclosed in copending application Ser. No. 07/806,942, the thresholding of the inspection gray scale signal is done after registration such that thresholding can be controlled by the reference data. Several versions of thresholded data are thus available as binary inspection data to several defect detection channels. Likewise, several levels of aligned reference images are available to the channels for other useful purposes.

The inspection system functions independently of image resolution because the reference and inspection images are of the same resolution. The defects to be rendered are dependent upon that specified by the product designers and the process engineers. Thus, each defect type to be found and rendered is processed by a separate channel whose output can be selected for entry into the defect memory. In this manner, several different product types or parts may be inspected with differing specifications. Each channel is created by cable plugging together connections to standard channel boards containing standard high speed morphological image processing devices.

BRIEF DESCRIPTION OF THE DRAWINGS

The foregoing and other objects, aspects and advantages will be better understood from the following detailed description of a preferred embodiment of the invention with reference to the drawings, in which:

FIG. 6 is a block diagram of a scrolling buffer and selector implemented with shift registers according to the embodiment of the invention;

FIG. 7 is a schematic representation of the real image scrolling buffer and selector;

FIGS. 14A, 14B and 14C are simplified block diagrams illustrating the image registration process carried out by the system shown in FIG. 12;

FIG. 18 is a pictorial representation of the image registration process;

FIG. 22 is an illustration of the non-update mode field relationships;

FIG. 33 is an illustration of best and next best match frame comparation matrices;

FIG. 39 is like FIG. 36 and in addition illustrates various matrices used in the vertical placement of frames;

FIG. 40 shows in more detail the joining of matrices for the placement of frames;

DETAILED DESCRIPTION OF PREFERRED EMBODIMENTS OF THE INVENTION

General Scheme

Figure 1:
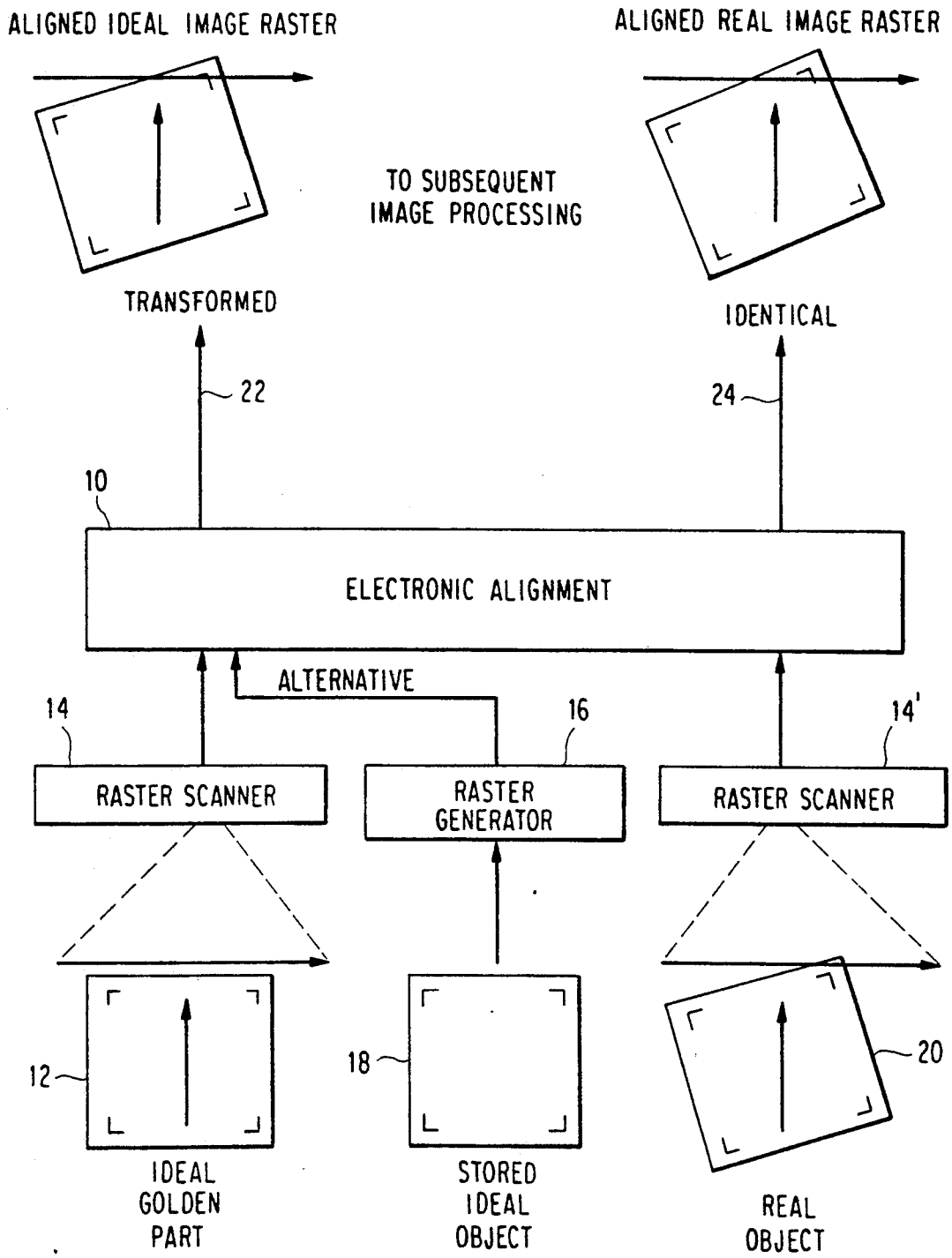
FIG. 1 is a generalized block diagram showing an electronic image registration system and illustrating the problem of alignment solved by this invention.

Referring again to the drawings, and more particularly to FIG. 1, image processing generally requires some comparison with or control by an ideal representative image. The source of ideal image data in the electronic alignment system 10 can be the simultaneous raster scanning of a "golden part" real object 12 by a raster scanner 14, a voluminous file (not shown) of rasterized ideal object data, or a rasterized expansion by raster generator 16 of stored compressed ideal object data 18.

As shown in FIG. 1, the real image data 20 acquired by raster scanner 14' generally is found translated, rotated, magnified, minified and/or distorted with respect to the ideal representation of the image. What is needed is a way to electronically register or align the ideal raster data 18 to the real raster data 20.

The electronic raster data alignment device 10 shown in FIG. 1 should simultaneously accept the streams of ideal and real raster image data, transform the ideal stream, and deliver the transformed ideal image stream 22 aligned with the original of the real image stream 24. The real image stream 24 is not transformed because a high fidelity image of the real object is generally required for such subsequent image processing as object measurement. The ideal image stream 22 is allowed to be transformed because it is generally a well known image which maintains its topology during transformation and could be retransformed if necessary.

Figure 2:
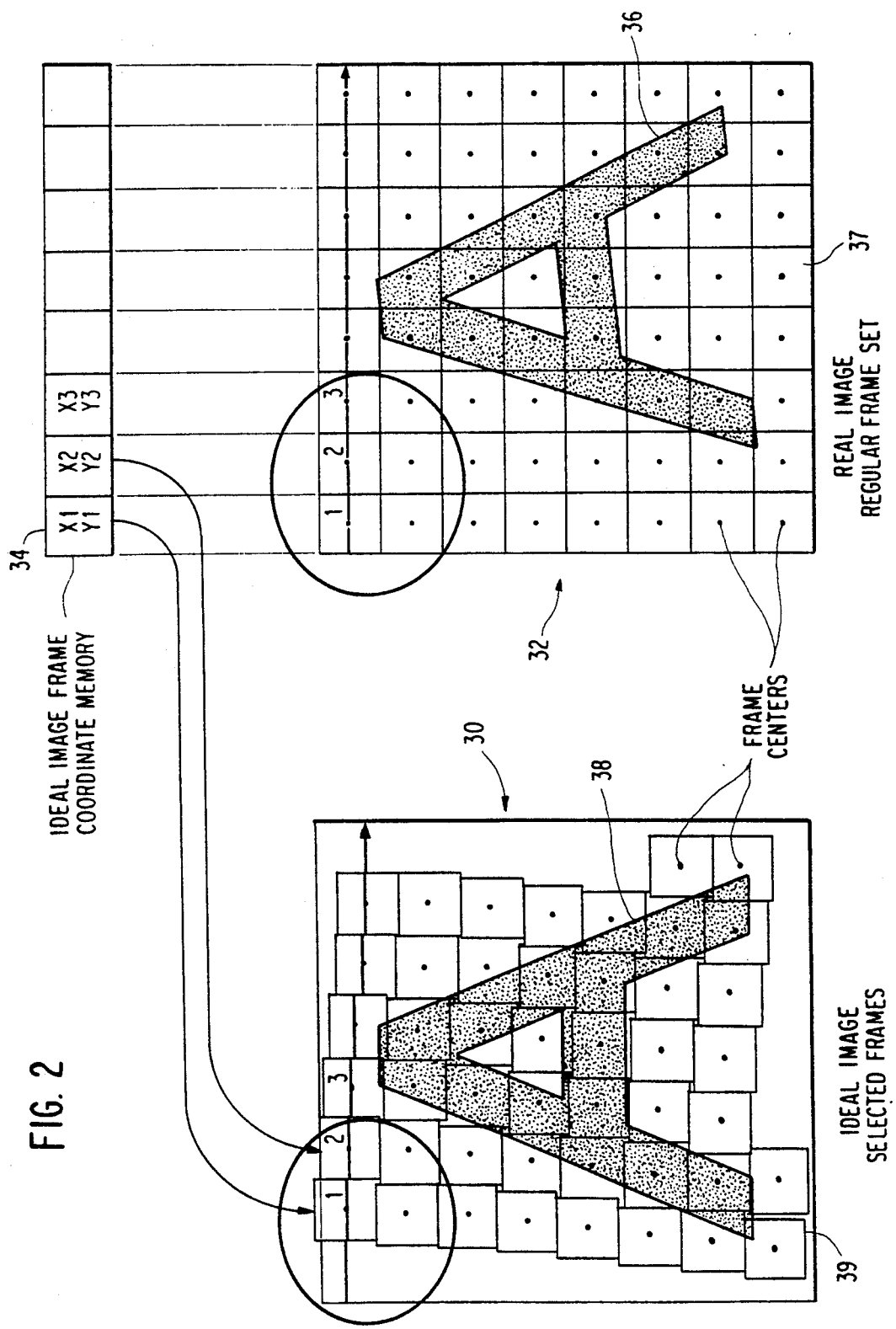
FIG. 2 is a representation of ideal and real images on respective arrays of frames together with a pictorial representation of the contents of the ideal image frame coordinate memory.

Referring next to FIG. 2, there is shown the general scheme of alignment according to the invention.

Frames of ideal image data 30 are selected from the ideal image field which best match frames of real image data 32 from the regular set of frames in the real image field. These frame locations are stored in the ideal image frame coordinate memory 34. For the sake of brevity and clarity of illustration, the number of frames shown in the ideal image frame coordinate memory 34 are eight, but the number of frames is normally several hundred or a thousand or more. A shaded letter "A" 36 represents a real object in a real image field 37 which appears translated, rotated, magnified, minified, and/or distorted with respect to the ideal letter "A" 38 representation shown in the ideal image field 39.

Figure 3:
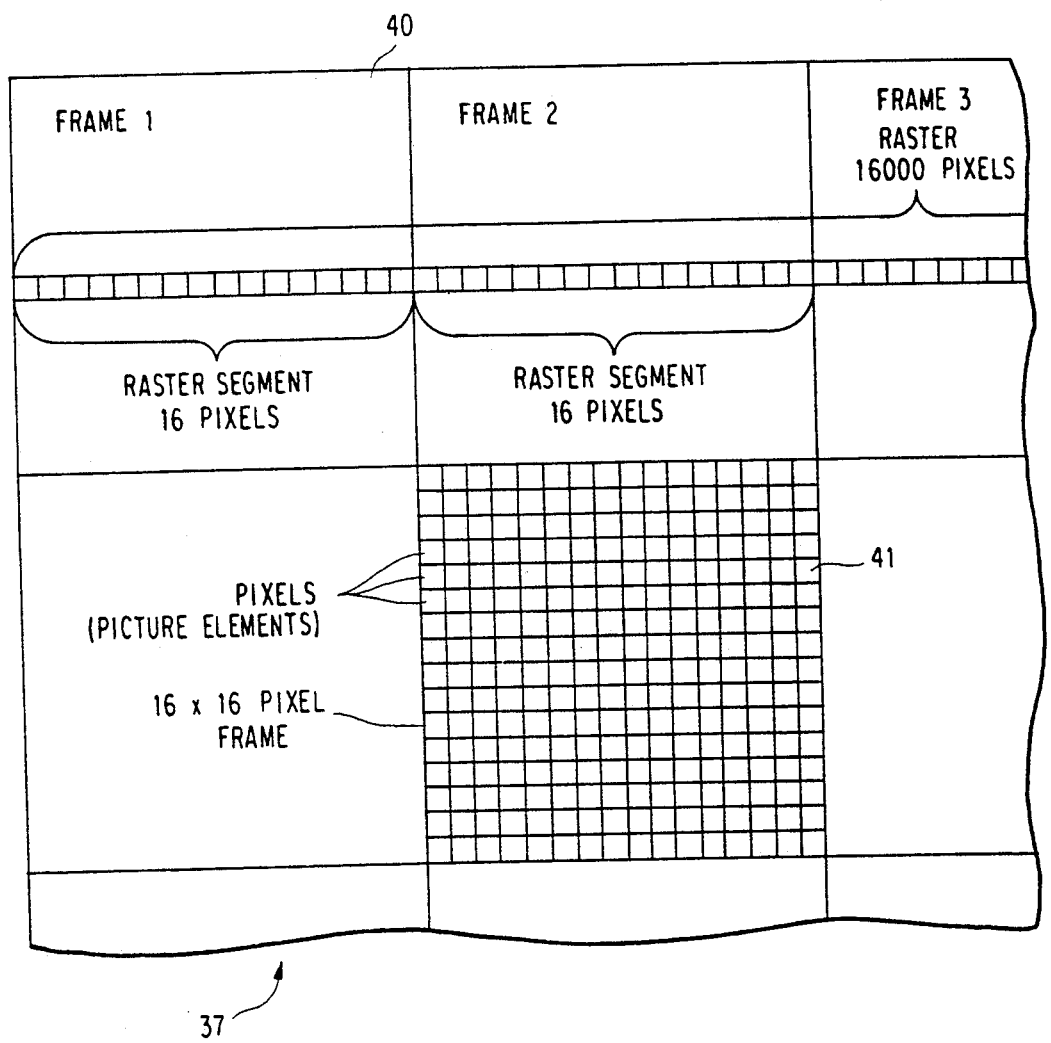
FIG. 3 is a more detailed illustration of the real image array of frames.

FIG. 3 shows in more detail the upper left corner of the real image field 37 which is circled in FIG. 2. The real image field 37 is sectioned into a regular grid of frames 40, each consisting of a fixed array of image pixels 41 (16×16 picture elements in the preferred embodiment). The real image is maintained intact in order to preserve the integrity of the image for subsequent image processing. Real image raster segments are of equal length and are formed from a continuous raster obtained from the image acquisition device (i.e., a raster scanner device). The number of frames 40 depends on the size of the real image field and the number of pixels making a frame. This device operates on a full width of the image acquisition device which typically has a horizontal field width of 16,000 pixels. Thus, 1,000 frames 40 are formed across the field 37. The vertical extent of frames is dependent upon the height of the real object field and can be much more than the horizontal extent. Real object images of wider formats must be scanned in strips in a serpentine manner.

Figure 4:
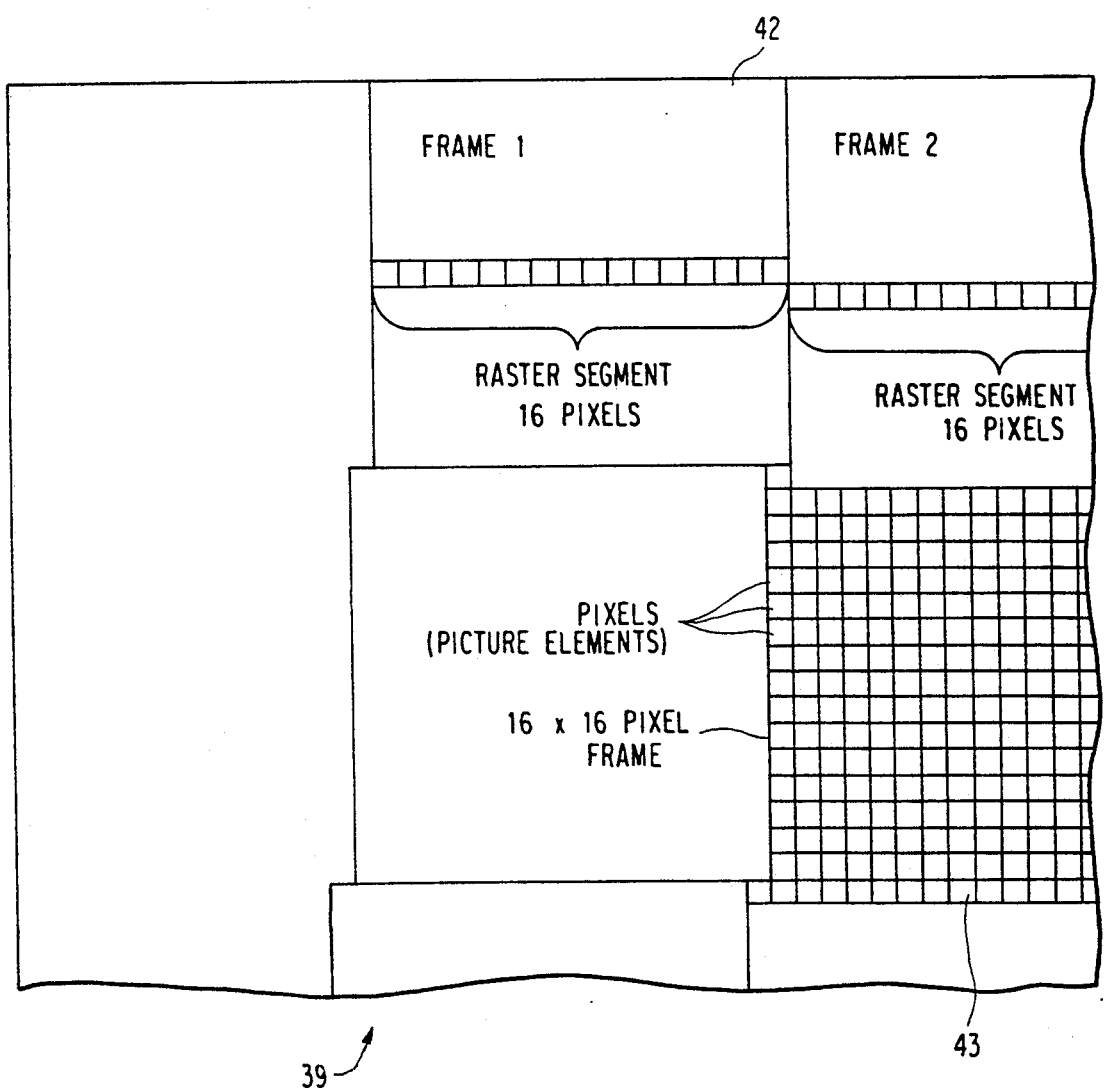
FIG. 4 is a more detailed illustration of the ideal image array of frames.

FIG. 4 shows the ideal image field 39 is not sectioned into a regular set of frames as is the real image field 37. Rather, a set of frames 42 are selected from the ideal image field 39, each frame consisting of a fixed array of image pixels 43 (i.e., 16×16 picture elements) that best match the regular frame set of the real image. The ideal image field 39 is made larger (see FIG. 2) with margins to compensate for the effect of translation and rotation on the selection of frames.

Each real and ideal frame has sixteen rows of sixteen pixels which are called raster segments. Each raster segment can be identified by its starting location in its respective image field. An ideal image frame coordinate memory 34 (FIG. 2) exists to record the starting addresses of the ideal raster segments. For each frame in a row of frames of real image data, there is an ideal frame coordinate entry.

The size of the frames have been chosen to satisfy two relationships. A smaller frame size allows greater rotational and magnification adjustment while selecting matching frames from the ideal image. A larger frame size allows for better area cross correlation of ideal images to defective real images.

Figure 5A:
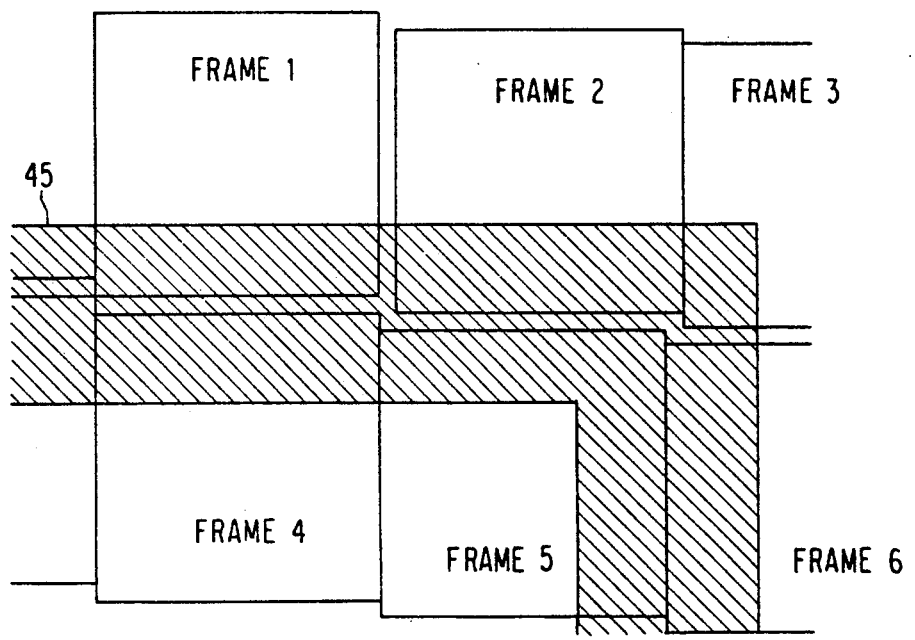
FIGS. 5A and 5B show the process of transforming a printed circuit wire feature in the ideal image field.
Figure 5B:
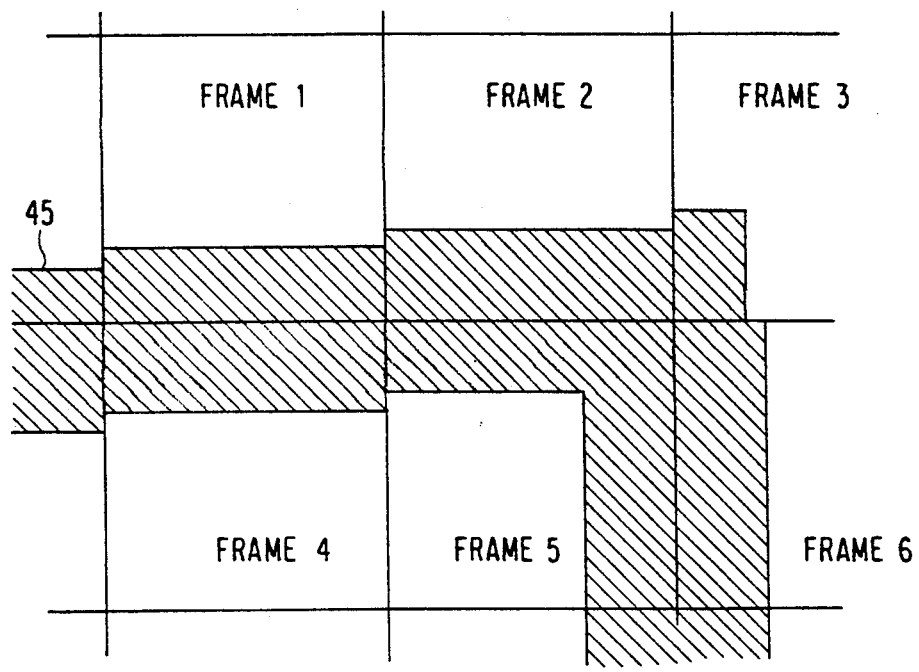

FIG. 5A shows an ideal image 45 of a printed circuit conductor. FIG. 5B shows an exaggerated example of the ideal image 45 of a printed circuit conductor undergoing a frame selection transformation. The spacing and the stepwise selection of frames when replaced on a regular gird yield a somewhat distorted image of a printed circuit wire. Under most image processing situations, this is tolerable because the feature is large, well defined and only its topology is of interest. Where regional integrity of the ideal image is desired, it is possible to control frame selection by fiducial generation techniques.

Scrolling Buffer

The electronic alignment system according to the invention requires the multiple use of a major component called a scrolling buffer. FIG. 6 illustrates in simple block diagram form a scrolling buffer 50 composed, in this example, of seven cascaded shift registers 51 to 57, inclusive, and a 7×3 selector 58 which receives the outputs of each of the shift registers. The first shift register 51 receives image data at its input, and its length or memory capacity is large enough to contain one full raster (i.e., 16,000 pixels) of image data. Each successive shift register 52 to 57 contains the next raster above in the image. The shift registers accept the raster one pixel at a time under the control of the clock.

While for clarity and brevity there are illustrated only seven shift registers in FIG. 6, it should be understood that in the preferred embodiment there is a capacity for one hundred sixty rasters. Although the preferred device employs shift register devices of bit capacity equal to raster length, it is possible to construct the scrolling buffer with random access memory (RAM) devices or video RAM (VRAM) devices. An example of a suitable 64K VRAM for this purpose is the Texas Instruments TMS4161EV4 multiport VRAM. Since the Texas Instruments TMS4161EV4 multiport VRAM is a commercially available device, it is not described here in detail. Each such VRAM can accept four raster lines. FIG. 7 is a schematic representation of the scrolling buffer 50 as used in subsequent illustrations, whether implemented using shift registers as shown in FIG. 6 or with VRAMs.

As mentioned, the alignment system operates upon small sections of large virtual fields. The small sections of the real and ideal images fields are held in respective scrolling buffers. As each image raster is generated by the raster scanners or raster generators, it is entered into the bottom of a scrolling buffer, causing all the buffered rasters to advance up one raster. The image would appear to be scrolling up through the buffer; hence, the name scrolling buffer. The raster at the top of the scrolling buffer advances out of the scrolling buffer and, if not used, is discarded.

Figure 8:
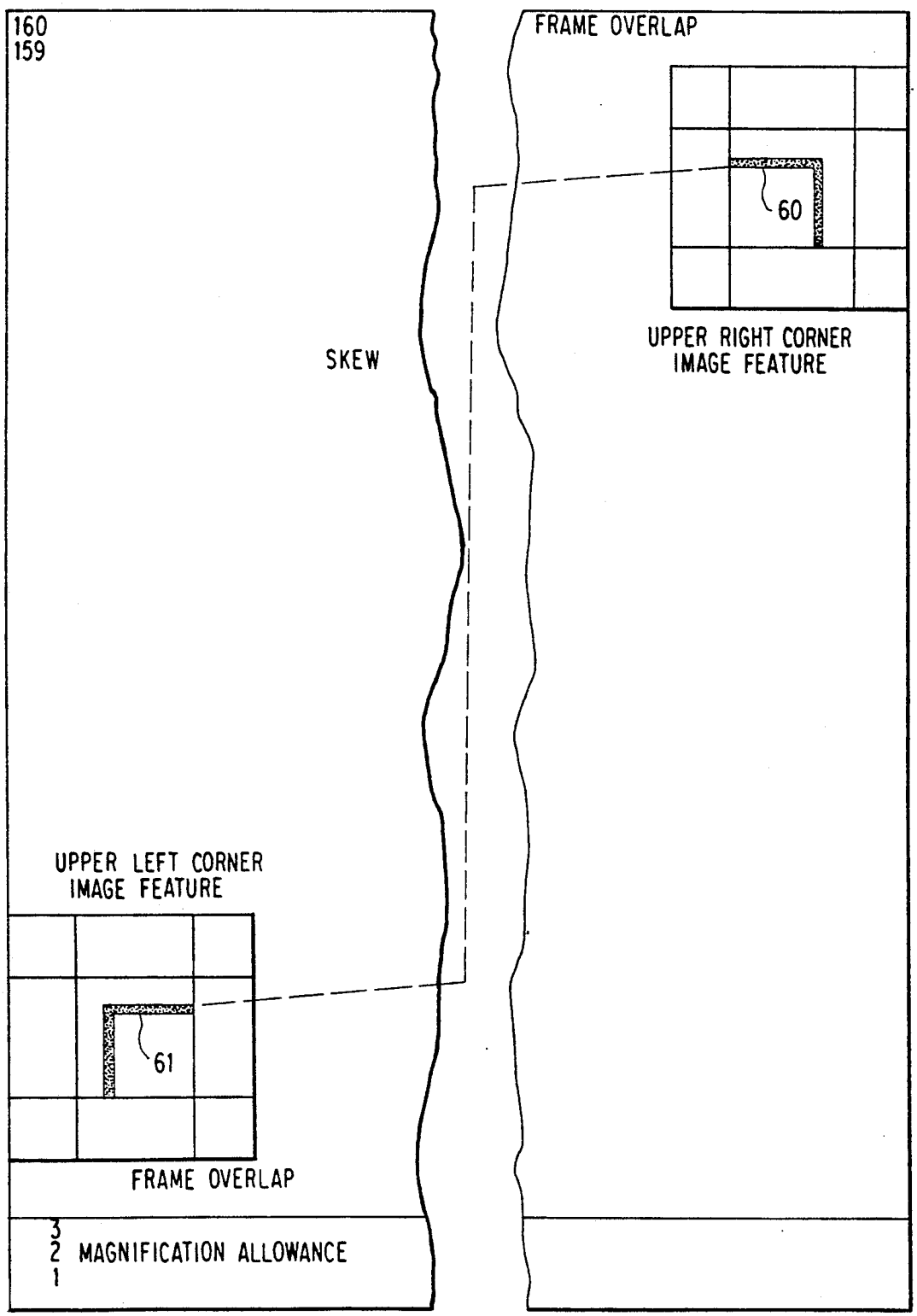
FIG. 8 is a map of the image frames showing the relationship between the upper corners of an image feature in the presence of skew.

The depth of the scrolling buffer is determined by the amount of real object to ideal object skew, the image resolution, the size of the frame comparators and the amount of magnification and distortion error expected over the virtual image scan. FIG. 8 shows the relationship where the upper right corner image feature 60 is vertically displaced from the upper left corner image feature 61. These image features, termed "bar and post" fiducials, are used for alignment in the preferred embodiments, as will be described in more detail hereinafter. This vertical displacement of the fiducials is termed "skew". The scrolling buffer must therefore be deep enough to contain the upper two corners of a maximally skewed real image, plus the size of the frame comparators, plus four rasters for each of the extra frame comparators, plus any expected magnification or distortion runout.

FIG. 6 shows that the outputs of all the shift registers 51 to 57 are available to a wide input selector 58. This selector 58 is a simple multiplexer/selector device which is addressed to cause one of the shift register output lines to be connected to an external output. Further, the multiplexer/selector device 58 is replicated (three times in this illustration) and connected to the buffer such that for the same address applied to all (three) selectors, the multiplexer/selector device 58 would provide an adjacent set of shift register outputs connected to (three) external outputs. FIG. 6 illustrates the case where shift registers 54, 55 and 56 are connected to the external outputs via the selector 58. Advancing the selector address would cause connection of shift registers 55, 56 and 57 to the external outputs.

Figure 9:
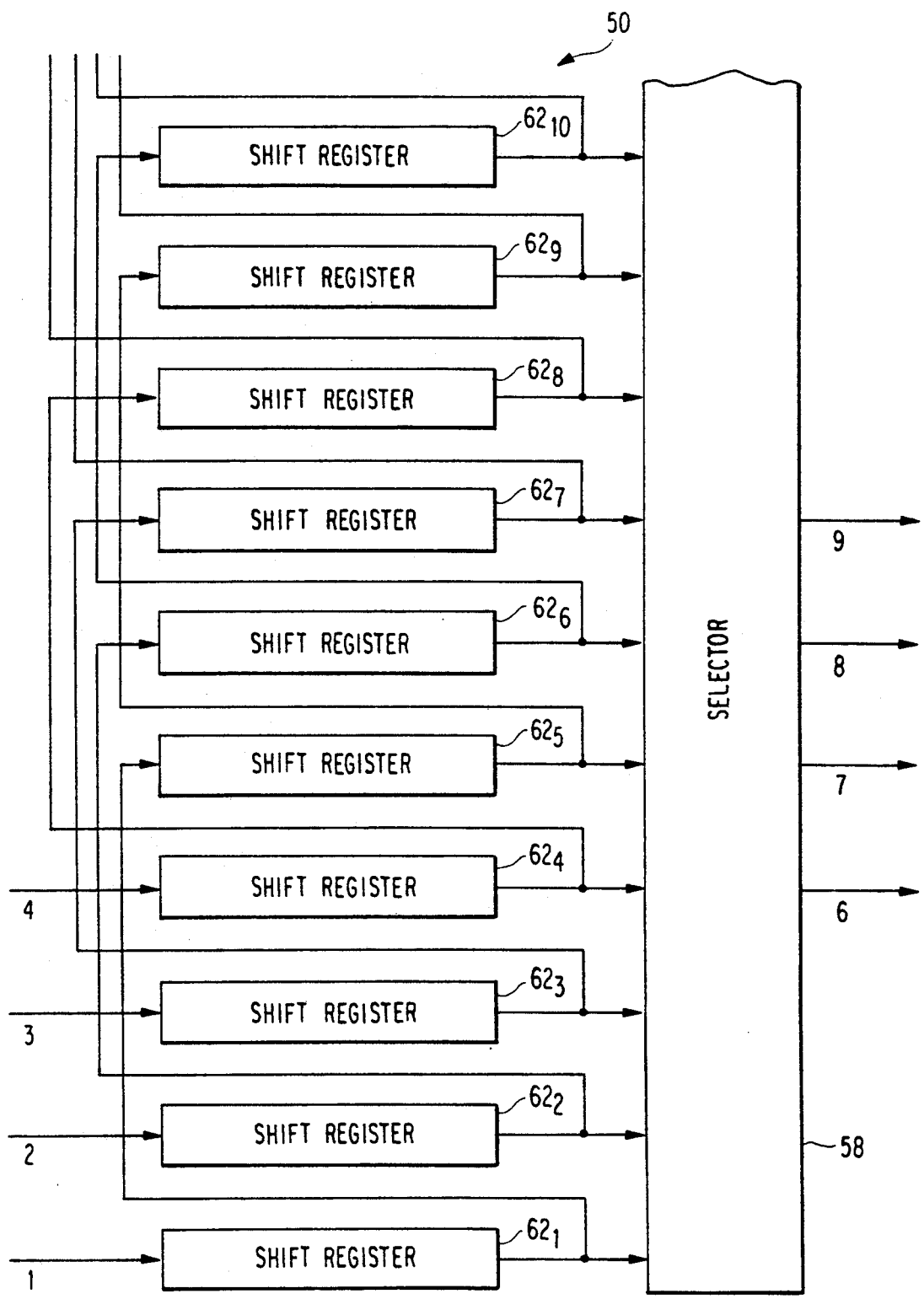
FIG. 9 is block diagram of four raster swath implementation of a scrolling buffer.

While FIG. 6 shows a simple one raster swath implementation of a scrolling buffer, FIG. 9 illustrates how a four raster swath is connected in a scrolling buffer and selector. In this embodiment, the scrolling buffer 50 is implemented with a plurality of shift registers $62_1$ to $62_n$ with a four raster swath being input to shift registers $62_1$, $62_2$, $62_3$, and $62_4$. The output of each shift register is input to selector 58 and to shift register $62_{i+4}$. The selector 58, in turn, selects a four raster swath, which in the illustration is the swath from shift registers $62_6$, $62_7$, $62_8$, and $62_9$. This overall approach is adaptable to any input/output raster advance combination.

Figure 10:
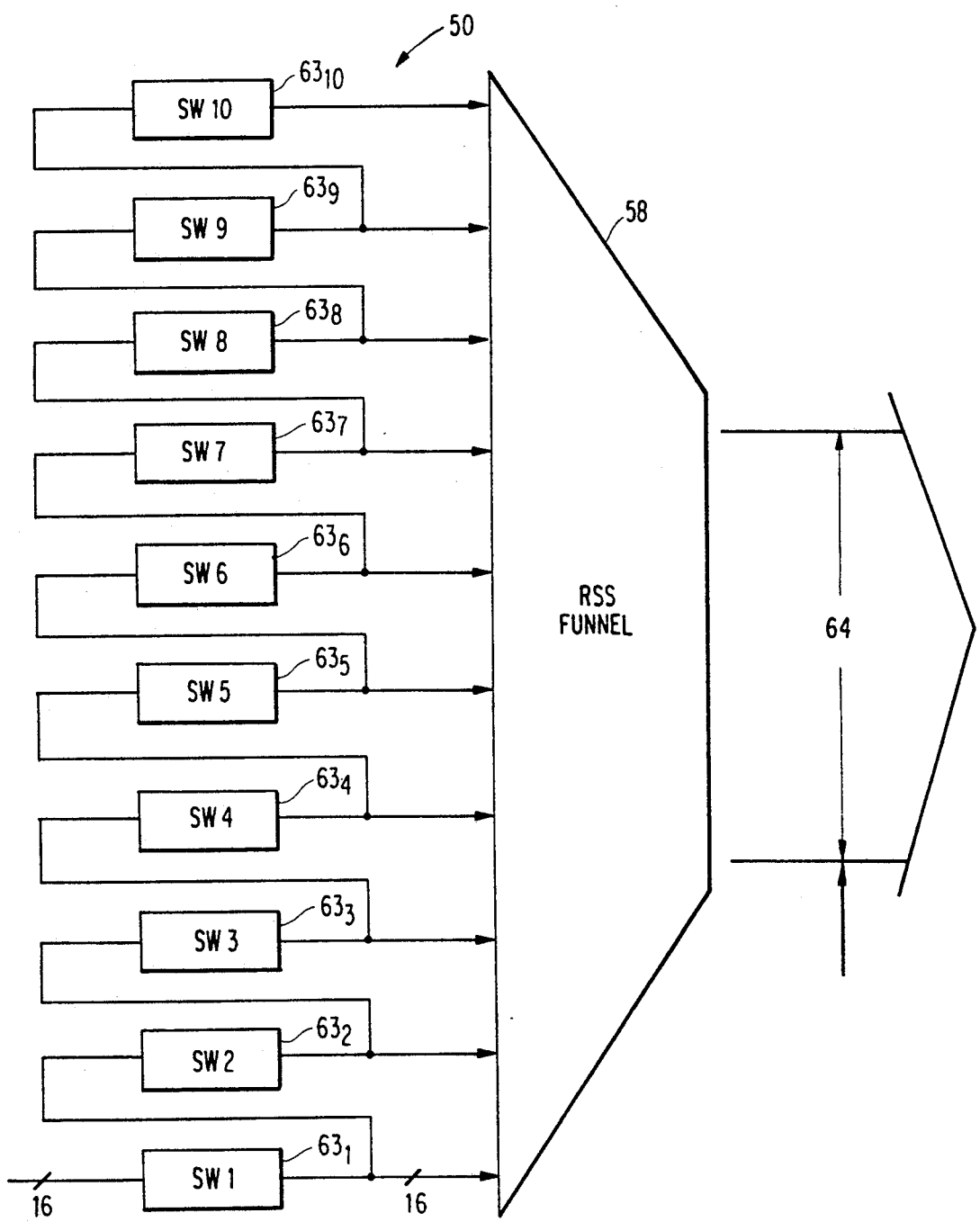
FIG. 10 is a block diagram of the ideal image scrolling buffer and selector according to a preferred embodiment of the invention.

FIG. 10 shows a preferred embodiment of the buffer 50 for the ideal image data. In this buffer, sixteen rasters are connected in a swath (SW), and this swath is one frame high. Each block $63_1$ to $63_{10}$ may be implemented as sixteen shift registers or as a plurality of VRAMs. Using the Texas Instruments TMS4161EV4 VRAMs mentioned above, each block $63_1$ to $63_{10}$ would be composed of four VRAMs, each accepting four input lines. An image ten frames high is thus held in the ideal image buffer at all times. The selector 58 selects a set of four frames high (i.e., four swaths or sixty-four rasters).

Figure 11:
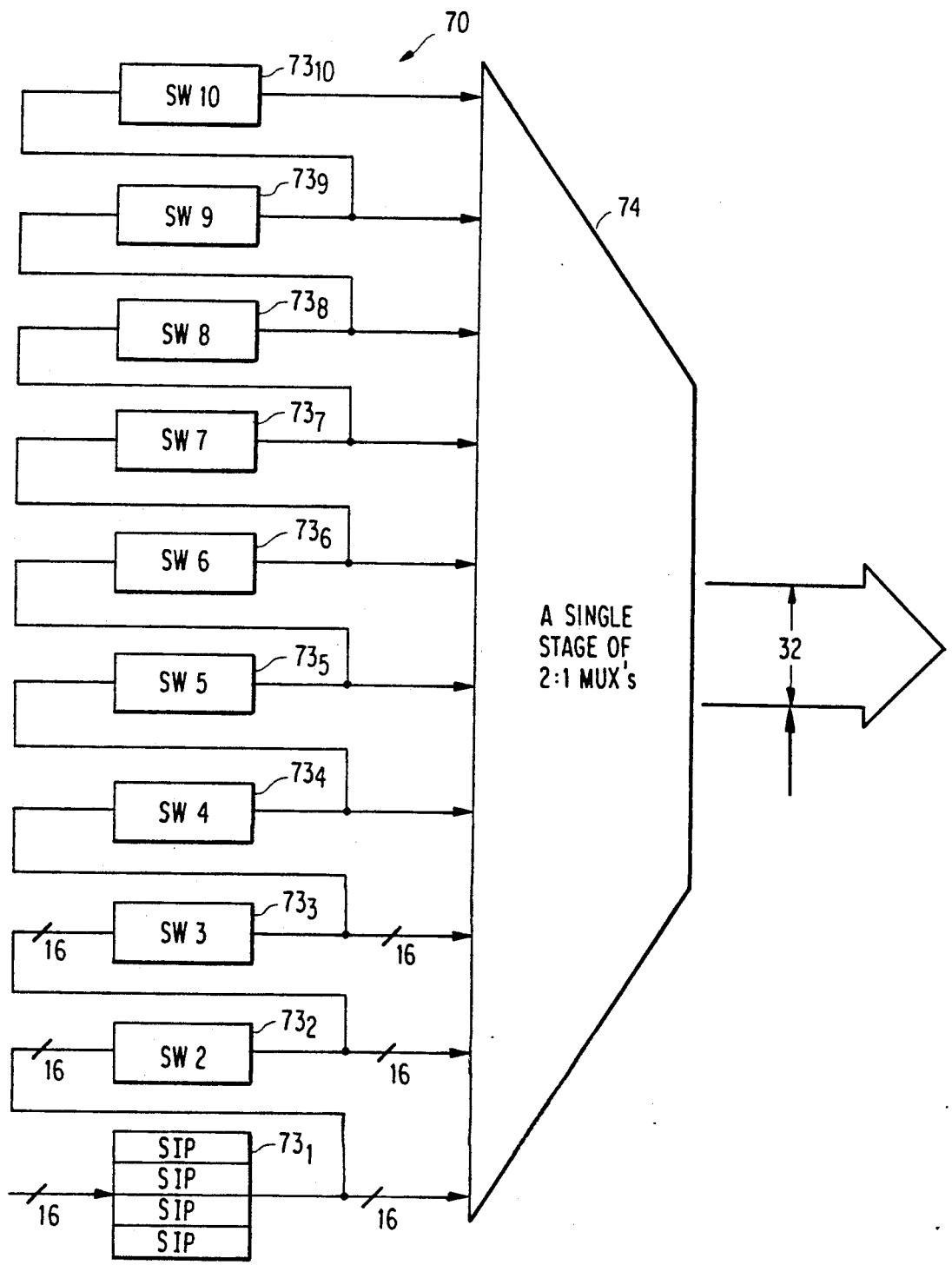
FIG. 11 is a schematic representation of the real image scrolling buffer and selector according to a preferred embodiment of the invention.

The real image buffer is a variation of this as shown in FIG. 11. More specifically, the buffer 70 for the real image data is also ten frames high and comprises blocks $73_1$ to $73_{10}$, similar to blocks $63_1$ to $63_{10}$, but the real image buffer selector 74 only selects two swaths (i.e., thirty-two rasters).

I. Basic Alignment Function

General

Figure 12:
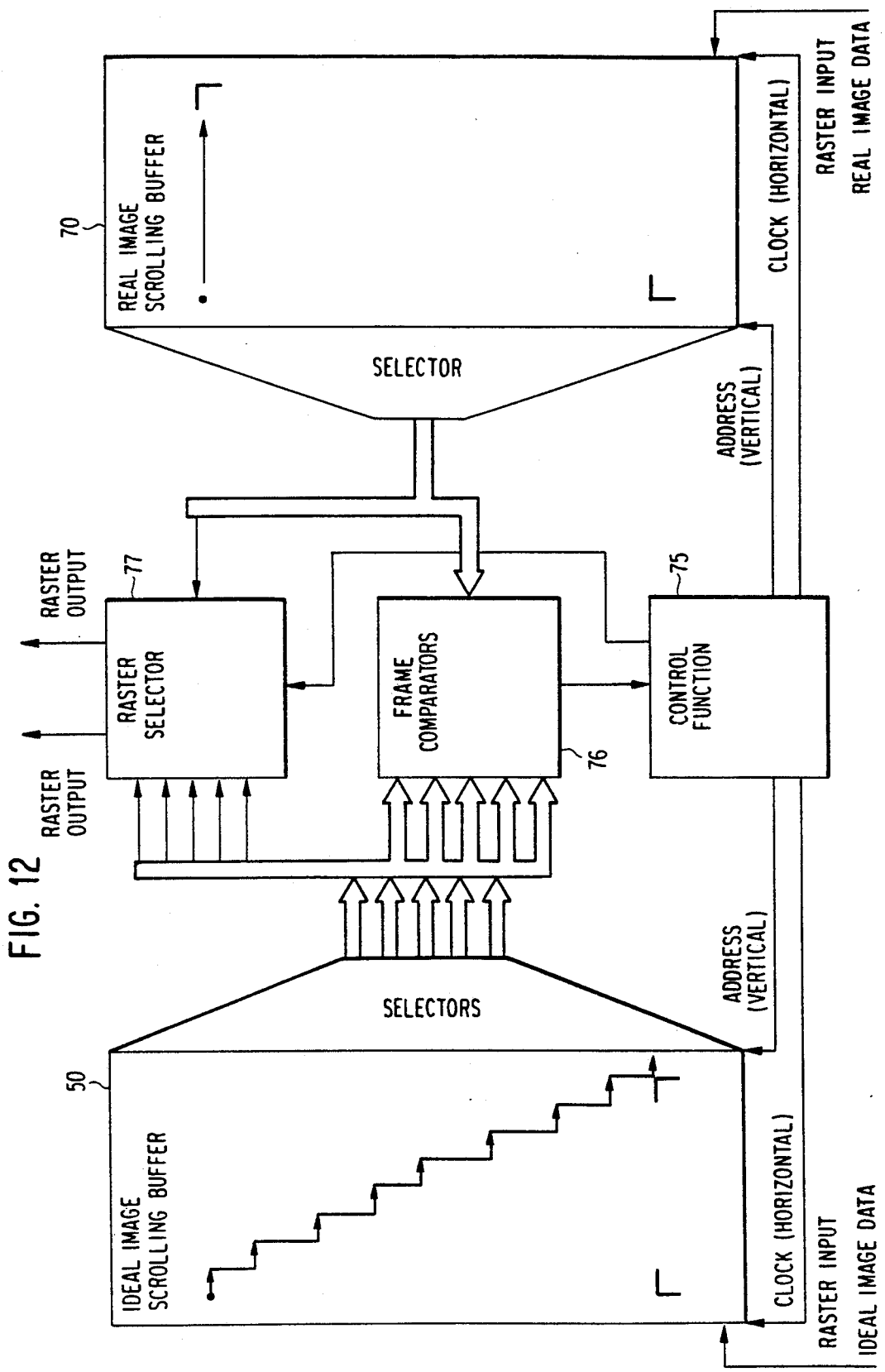
FIG. 12 is a block diagram showing the basic image registration system according to the invention.

FIG. 12 illustrates the basic organization of the invention. It consists of the scrolling buffers 50 and 70 that move and advance their respective ideal and real images under the control of control function 75. The outputs of the scrolling buffers 50 and 70 are supplied to frame comparators 76 which provide an output to the control function 75. In addition, the scrolling buffers 50 and 70 provide outputs to raster selectors 77 which provide raster outputs under the control of control function 75. Ideal frame selection (to match the real image frame) is made by increments and/or decrements in the horizontal and vertical directions controlled by the control function 75. Vertical adjustments are made by a three stage selector circuit in buffer 50. Horizontal adjustments are made by control of the ideal image scan clock to data first-in, first-out buffers (FIFOs) located in the raster selector 77.

The control function 75 can operate in one of two modes; a non-update mode and an update mode. The non update mode performs alignments of ideal images to real images based strictly on initial alignment real part skew and magnification (or minification) with respect to the real image. The update mode performs the same alignment function as the non-update mode but, in addition, performs alignment adjustments throughout the registration process.

Ideal and Real Image Selectors

Figure 13:
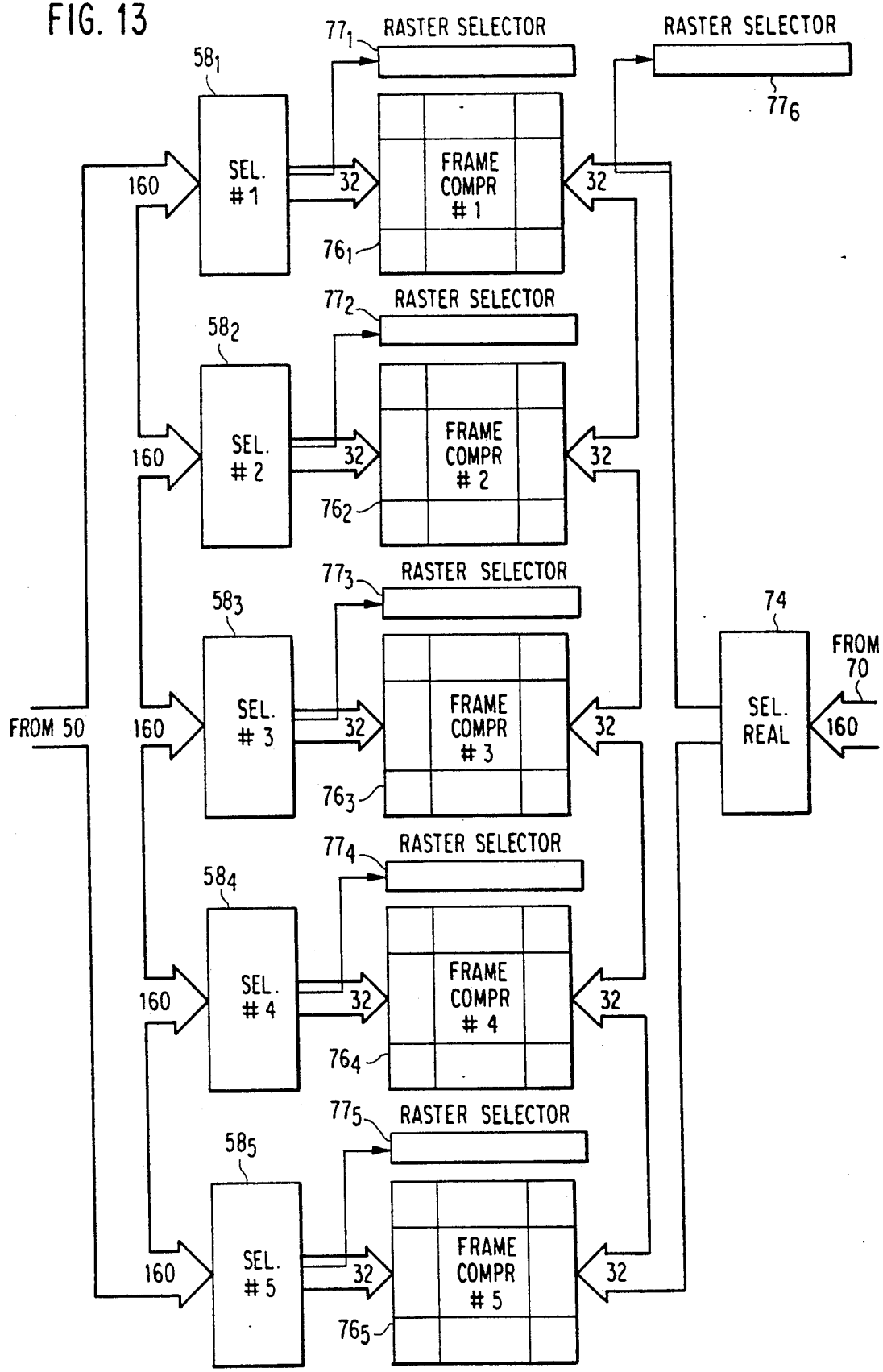
FIG. 13 is a block diagram showing in more detail the frame comparators and raster selectors of the image registration system shown in FIG. 12.

In FIG. 13, the output of ideal buffer 50 is delivered by selectors $58_1$ to $58_5$ to the frame comparators $76_1$ to $76_5$ and the raster selectors $77_1$ to $77_5$. The real image scrolling buffer 70 feeds one selector 74 which remains fixed on one desired row of frames and delivers those frames to the same set of comparators $76_1$ to $76_5$ and a separate raster selector $77_6$. The outputs of the scrolling buffer selectors are a sequence of sixteen raster segment frames with top and bottom eight raster margins to meet the frame comparator requirements.

Ideal and real image frames continue to advance synchronously into the frame comparators $76_1$ to $76_5$ under the control of their respective clocks and selector addresses. Synchronously, the top raster of each of the five ideal frames and the real frame advance into the raster selectors $77_1$ to $77_6$.

Horizontal alignment adjustment of the ideal image frame to the real image frame is made by adding or deleting clock pulses to the ideal image scrolling buffer 50 while maintaining the clocking of the real image scrolling buffer 70 constant. Vertical alignment adjustment of the ideal image frames to the real image frame is made by changing the address to the ideal scrolling buffer selectors $58_1$ to $58_5$ while holding the real image scrolling buffer selector 74 address constant.

With the real image restrained from advancing, the ideal image is advanced one pixel, and a second comparison is made and its correlation score is recorded. Once again, the ideal image is advanced and a third comparison is made and the correlation score recorded.

FIGS. 14A, 14B and 14C illustrates the process, showing that each of three out of the five comparators $76_1$ to $76_5$ is providing the three horizontal correlation scores into a 3×3 matrix 78. The matrix ultimately contains an indication of the best comparison position.

Referring back to FIG. 12, the frame comparators 76 determine which frame in a matrix of ideal frames matches best to the real frame and provides that information to the control function 75. The control function 75 uses this information together with frame placement information to control the selection of a raster in the raster selectors 77.

As shown in FIG. 14A, 14B and 14C, three of the five comparators $76_1$ to $76_5$ are used to provide correlation scores for the central and adjacent frames of ideal image, with the other two frame comparators remaining idle but holding the outer adjacent frame images. This example shows in FIG. 14A the "Nth" frames residing in the five comparators and the central frame assigned to comparator $76_3$ as it is centered on scrolling buffer line number eighty and the selector address is eighty. However, the frame "N" comparison in FIG. 14A shows that the best match is found with the bottom frame centered around scrolling buffer line number seventy-nine as found in comparator $76_4$.

The system control function 75 (FIG. 12) adjusts the selector addresses for the next set of frames ("N+1") in FIG. 14B such that only comparator $76_1$ is reassigned from holding frames centered on buffer line number eighty-two to holding frames centered on line number seventy seven and reassigning the central frame to comparator $76_4$. Basically, the 3×3 best match matrix 78 is the item together with one outer comparator that move during reassignment. In this manner, the contents of the remaining four comparators do not suffer a disjoint as the "N+1st" frames are advanced into the comparators.

With the central frame now centered on line seventy-nine and comparator $76_4$ assigned as the central comparator, FIG. 14B shows that a best match is found in the comparator $76_5$ which is holding the bottom frame. The system control function 75 (FIG. 12) again adjusts the selector addresses for the next set of frames ("N+2") in FIG. 14C such that only comparator $76_2$ is reassigned from holding frames centered on line number eighty-one to holding frames centered on line number seventy-six and reassigning the central frame to comparator $76_5$. This scheme of assigning comparators to central, top, bottom, and idle frames is called barrel rolling.

Figure 15:
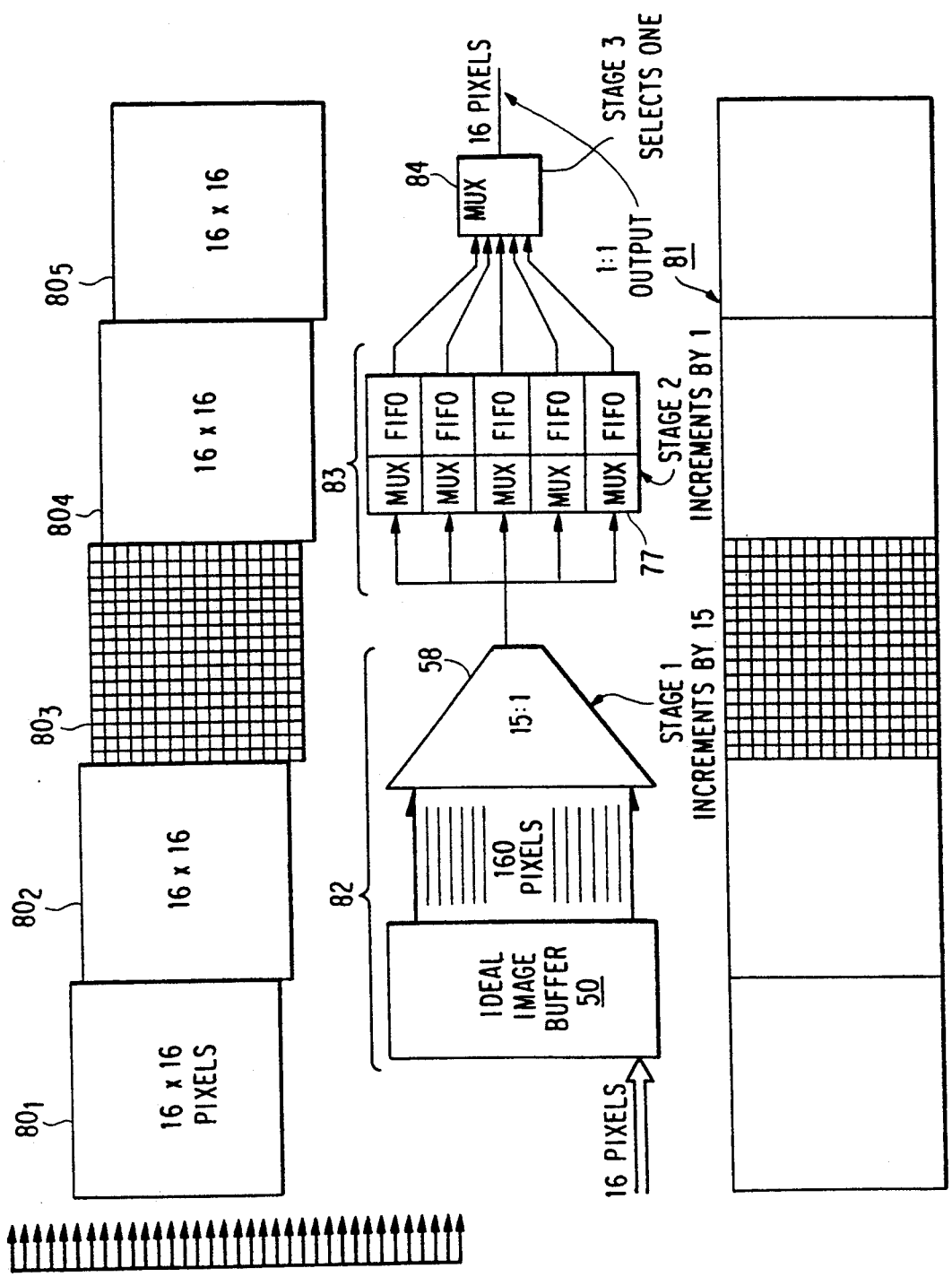
FIG. 15 is a functional block diagram showing in more detail the flow of ideal image data from the ideal scrolling buffer.

FIG. 15 shows in more detail the flow of ideal image data from the scrolling buffer 50. FIG. 15 illustrates the three stage selector scheme by which frames are vertically selected. Five frames $80_1$, $80_2$, $80_3$, $80_4$, and $80_5$ vertically displaced from each other by one or more rasters are selected and placed in a straight swath as the output 81. The first stage 82 is comprised of the ideal image scrolling buffer 50 and its selector 58 and advances by fifteen rasters. The second stage 83, comprised of raster selectors 77 including their FIFOs, advances by five rasters. The third stage 84 is located at the FIFO outputs and selects a single raster basis within the five rasters.

One advantage of the three stage selector hardware approach is a minimization of hardware. This same three stage selector approach is used for the data flow to the correlators in the frame comparators 76.

Figure 16:
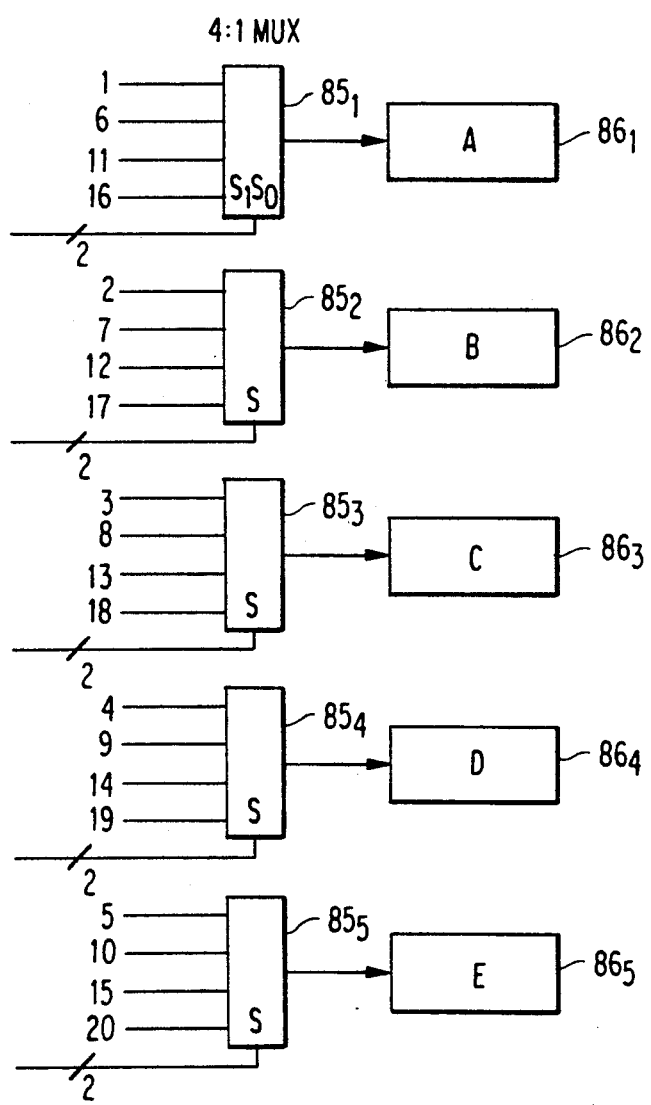
FIG. 16 is a functional block diagram of the second stage of FIG. 15 illustrating the FIFO barrel-rolling technique according to the invention.

FIG. 16 shows in more detail the multiplexers driving the FIFOs (or the correlators) which comprise the second stage 83 of the frame vertical addressing scheme. Note that the four way multiplexers $85_1$ to $85_5$ connect to the ideal buffer selector output lines in the pattern 1, 6, 11, 16; 2, 7, 12, 17; etc. When the multiplexer address is changed, for example from zero to one, the top line entering the FIFOs $86_1$ to $86_5$ moves from selector output line 1 to 6. The effect is a "barrel-roll" of the FIFOs from the top of the group to the bottom, since the bottom FIFO multiplexer is addressing selector output line 6.

Figure 17A:
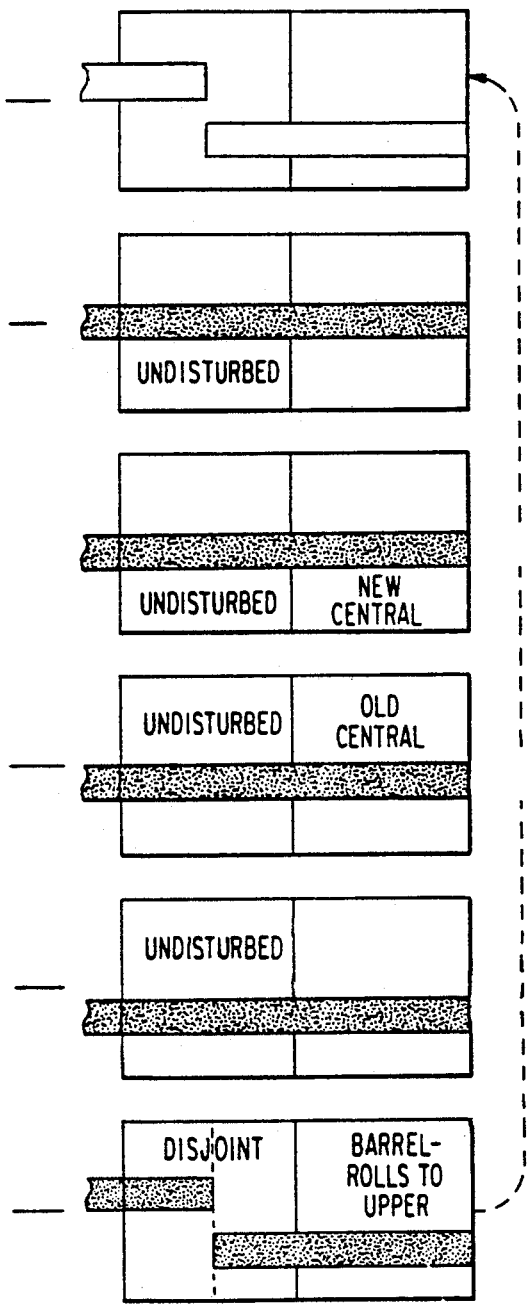
FIGS. 17A and 17B show, respectively, the effect of the barrel roll next address and the all move next address for each of five frame comparators.
Figure 17B:
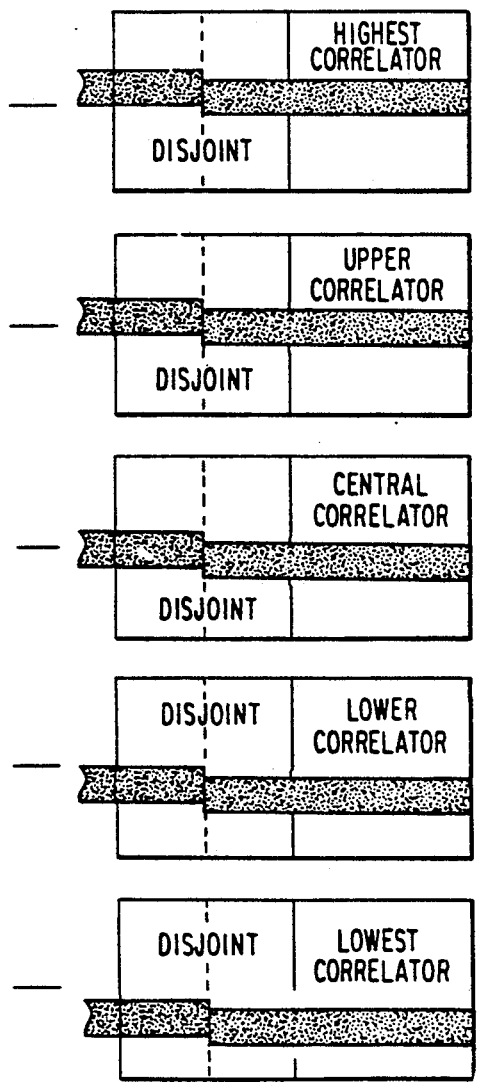

The scrolling buffer to correlator and FIFO selector functions could have been implemented in a more straight forward manner as a simple but large (160-32):1 multiplexing scheme. The second advantage of the three stage selector address scheme over the simple scheme is illustrated in FIGS. 17A and 17B, noting the contrasting frame comparator contents. FIG. 17A (the barrel-rolling scheme according to the invention) shows that the idle frame comparator $76_1$ contains the only advancing disjoint image. FIG. 17B (the simple scheme) illustrates the effect of an all frame move, which could be limited to three comparators, but nevertheless all three comparators $76_3$, $76_4$ and $76_5$ and the raster selectors for that matter, contain disjoint images. Disjoint images, on the next frame alignment, can cause an instability in the alignment process.

Frame Comparator (Cross Correlator)

Ideal and real image frames advance synchronously into the frame comparators under the control of their respective clocks and selector addresses, as well as into the raster selectors. FIG. 18 shows more detail of the operation of one of the frame comparators $76_1$ to $76_5$. Full sixteen pixel frames of the ideal and real images enter the comparator $76_i$. A comparison is made and the correlation score is computed.

In the preferred method of implementing the frame comparator, thirty-two by sixty-four pixel fields of real and ideal images are available in a correlator field. The correlator field is masked to correlate only on the region of interest. Typically, a correlator board contains thirty-two correlator integrated circuits (ICs) together with a parallel adder and the second stage frame addressing multiplexer. Five identical such boards are connected to the ideal buffer selectors $58_1$ to $58_5$, each displaced by one frame centerline.

Clock Control and Horizontal Adjustments

Figure 19:
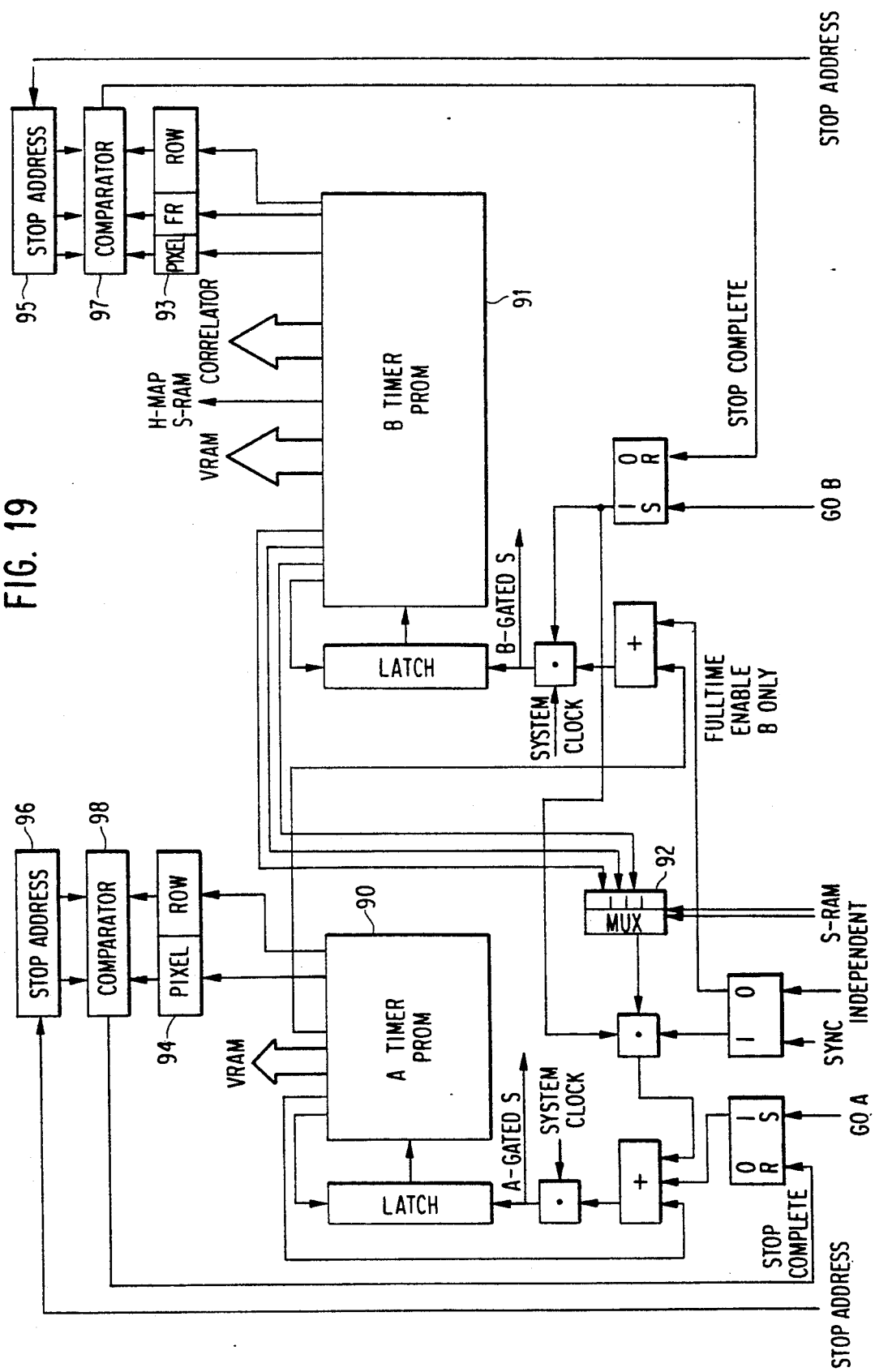
FIG. 19 is a block diagram of the timing circuits which form part of the control function shown in FIG. 12.

Horizontal adjustments of the ideal image frame are made by adding or deleting clock pulses to the ideal image scrolling buffer 50 while maintaining the clocking of the real image scrolling buffer 70 constant. Buffer clocking is accomplished with the clock circuit shown in FIG. 19, which is part of the control function 75 (FIG. 12). The B-timer PROM 91 controls the real buffer 70. The A-timer PROM 90 controls the ideal buffer 50. Initially, the A-timer PROM 90 runs independently to tab and end move the ideal image buffer. The A-timer PROM 90 runs synchronously with the B-timer PROM 91 when registration is being made. Gap and overlap are accomplished by a history map static random access memory (SRAM) control of a multiplexer 92 which causes the −1, 0, +1 adjustments.

A sequencer (not shown) initiates the timers by resetting or presetting a pixel address in registers 93 and 94, respectively, commanding them to run. The timers automatically stop at a preset stop address in registers 95 and 96, respectively, as detected by comparators 97 and 98. Both the A and B timer PROMs 90 and 91 are lookup tables, the size and contents of which are dependent on the selected shift register implementation.

The B-timer PROM 91 provides a set of sixteen pixel advance pulses followed by two rest pulses. The A-timer PROM 90 follows by providing a set of fifteen, sixteen or seventeen pulses followed by three, two or one rest pulses. The effect of these pulses is to move the ideal and scan frames into and through the correlators and FIFOs. A frame of sixteen pixels is centrally contained within a larger correlation area of $32 \times 32$ pixels. Other timing includes the clock pulses necessary to cause the correlators to provide scores on the correlation of the two images. Five horizontal correlation scores are generated for each correlator for every real image frame advanced.

Correlator Output and Adjustments

The purpose of having five vertically displaced ideal frames is to provide comparisons of the real frame to a central ideal frame and its top and bottom adjacent frames. The other two frame comparators are active only to provide a continuity of image data when frame selection causes the central, top and bottom comparators to be reassigned. Again, note that five comparators $76_1$ to $76_5$ provide correlation scores for only three adjacent frames selected.

II. Non-Update Mode of Registration

General

Figure 20:
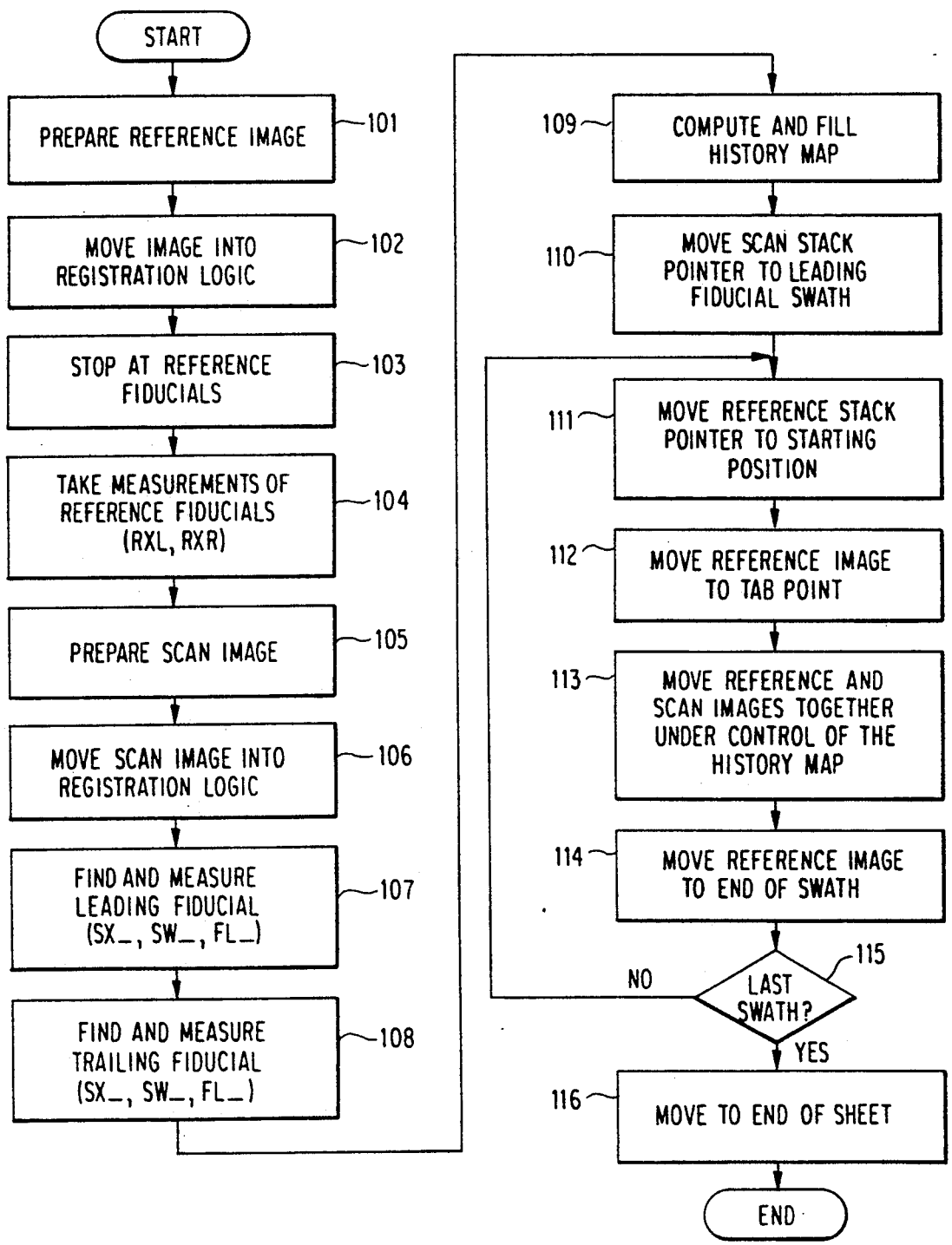
FIG. 20 is a flow chart of the alignment process in the non-update mode according to the invention.

FIG. 20 shows a top level flow chart of the sequences and tasks necessary to accomplish a registration in the non-update mode. The process begins by preparing the reference or ideal image in function block 101. This is done by, for example, the raster scanner 14 or raster generator 16 (FIG. 1). The ideal image is then moved into the registration logic shown in FIG. 12, in function block 102. In the case being described, only portions of the image are used for registration. These portions are marked with fiducials. This greatly speeds up the registration process. Thus, in function block 103, the fiducials are identified, and in function block 104, the positions of the fiducials are measured.

Meanwhile, the scanned in real image is prepared in function block 105. This is typically done by a video camera (e.g., the raster scanner 14' in FIG. 1). The real image is moved into the registration logic shown in FIG. 12, in function block 106. Next, the leading fiducial is identified and its position is measured in function block 107. Likewise, the trailing fiducial is identified and its position is measured in function block 108.

At this point in the process, a history map is computed and stored in function block 109. Then the real image buffer pointer is moved to the leading fiducial swath in function block 110. The ideal image buffer pointer is moved to its starting position in function block 111. The ideal image is moved to the first tab point in function block 112. Now, in function block 113, the ideal and real images are moved together under control of the history map computed in function block 109.

In function block 114, the ideal image is moved to the end of the swath. A test is then made in decision block 115 to determine if this is the last swath. If not, the process loops back to function block 111 where the ideal buffer pointer is moved to the starting position and the subsequent process is repeated. If the last swath, then the image is moved to the end of the sheet in function block 116 before the process ends.

Figure 21:
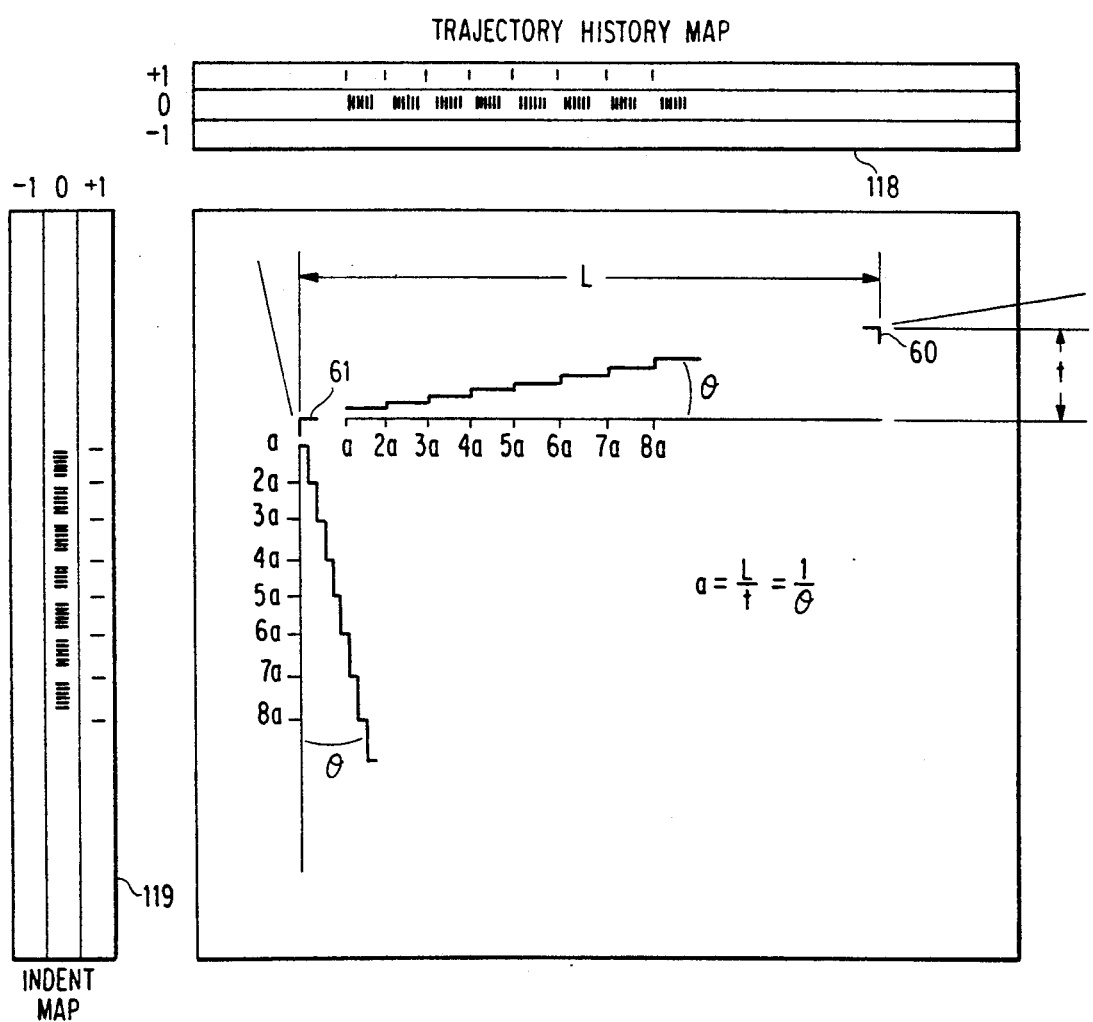
FIG. 21 is pictorial representation illustrating the translational and rotational alignment process.

Left and right fiducials 60 and 61, as shown in FIG. 21 (see also FIG. 8), provide the information needed to make the translational and rotational alignments between the two images. A history map 118 and an identical indent map 119 are formed in a static random access memory (SRAM) to control the ideal raster field.

FIG. 22 shows the relationship and effects of the non-update mode of operation. The simple rule is that the current frame be placed next to the previous frame following the relationship of the above frame to its previous frame. The history map contains the relationship between horizontally located frames which should be kept from swath to swath. While the real image framework is regular, the resulting ideal framework which follows the history map and the adding by the indent map is not necessarily regular (see again FIG. 4).

Figure 23:
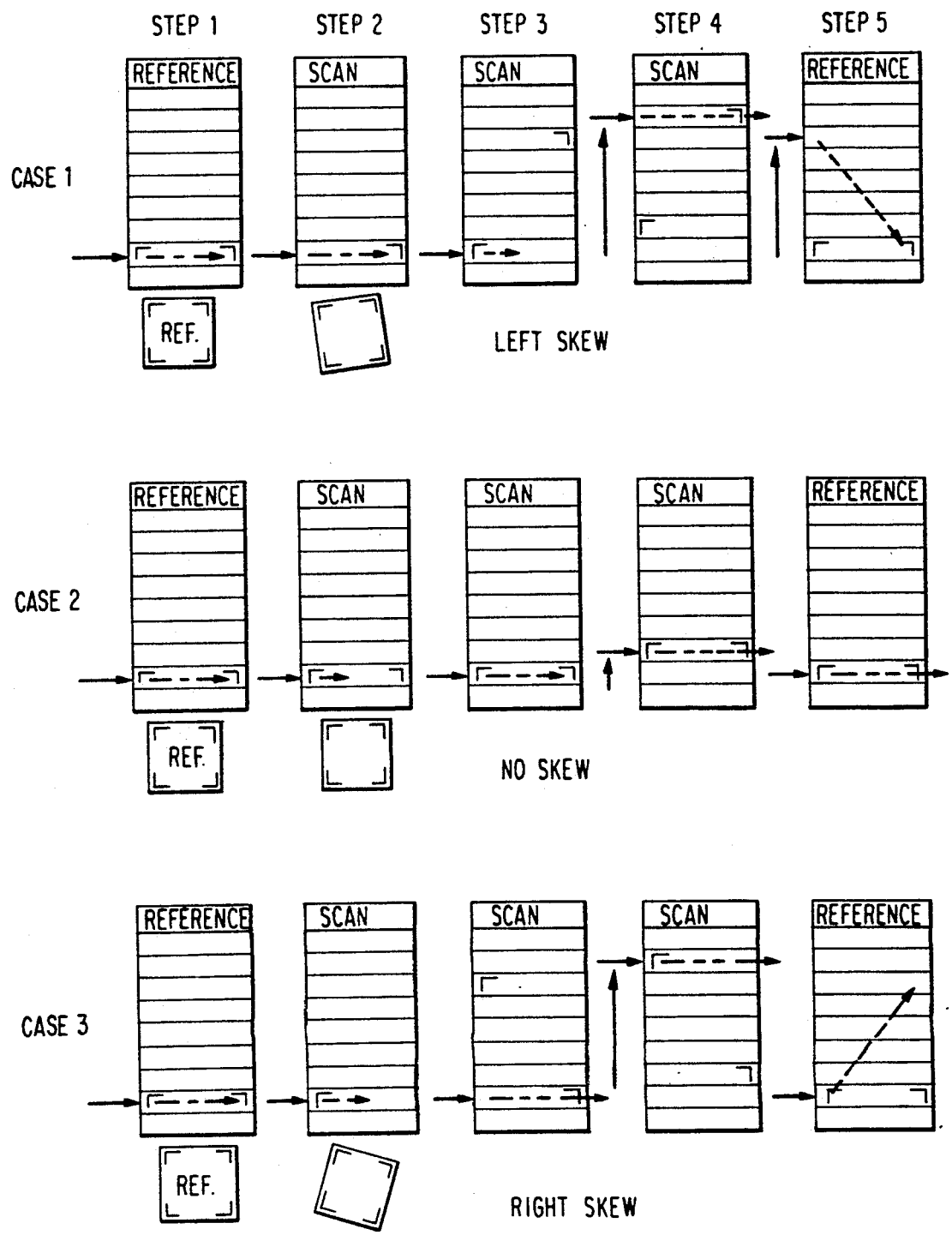
FIG. 23 shows the position of images in scrolling buffers as affected by skew.

In order to initialize the history and indent maps, the locations of the ideal and real image fiducials must be found and communicated to that circuit. FIG. 23 shows several of the steps taken for three cases of alignment to get that information. Step one is involved in obtaining the ideal fiducial locations. The preferred embodiment makes the measurements as the fiducial is moved into the ideal image scrolling buffer.

The real image might be skewed either to the left (case 1) or to the right (case 3) and, occasionally, might not be skewed at all (case 2). One fiducial moves into the buffer first and is measured. It moves up the buffer until the second fiducial enters and is measured. Then the real image buffer pointer moves up the buffer to the first fiducial and remains there for the remainder of the registration process. To compensate for the skew of the real image while tracking horizontally in the real image buffer, the tracking in the ideal image buffer is skewed, either starting before the left fiducial and moving down to the right fiducial (step 5, case 1) or starting at the left fiducial and tracking up to the right fiducial (step 5, case 3).

Fiducial Finding

While there are many applications of this invention, there are also many kinds of fiducials upon which to initiate the alignment process. Such fiducials might include dots, crosses, bars, posts, etc. In order to recognize a particular fiducial type, the sequencer and correlator mask PROMs are programmed appropriately. In this embodiment, bar and post fiducials (i.e., ⌐, ¬, L, and ⌐) are used.

Figure 24:
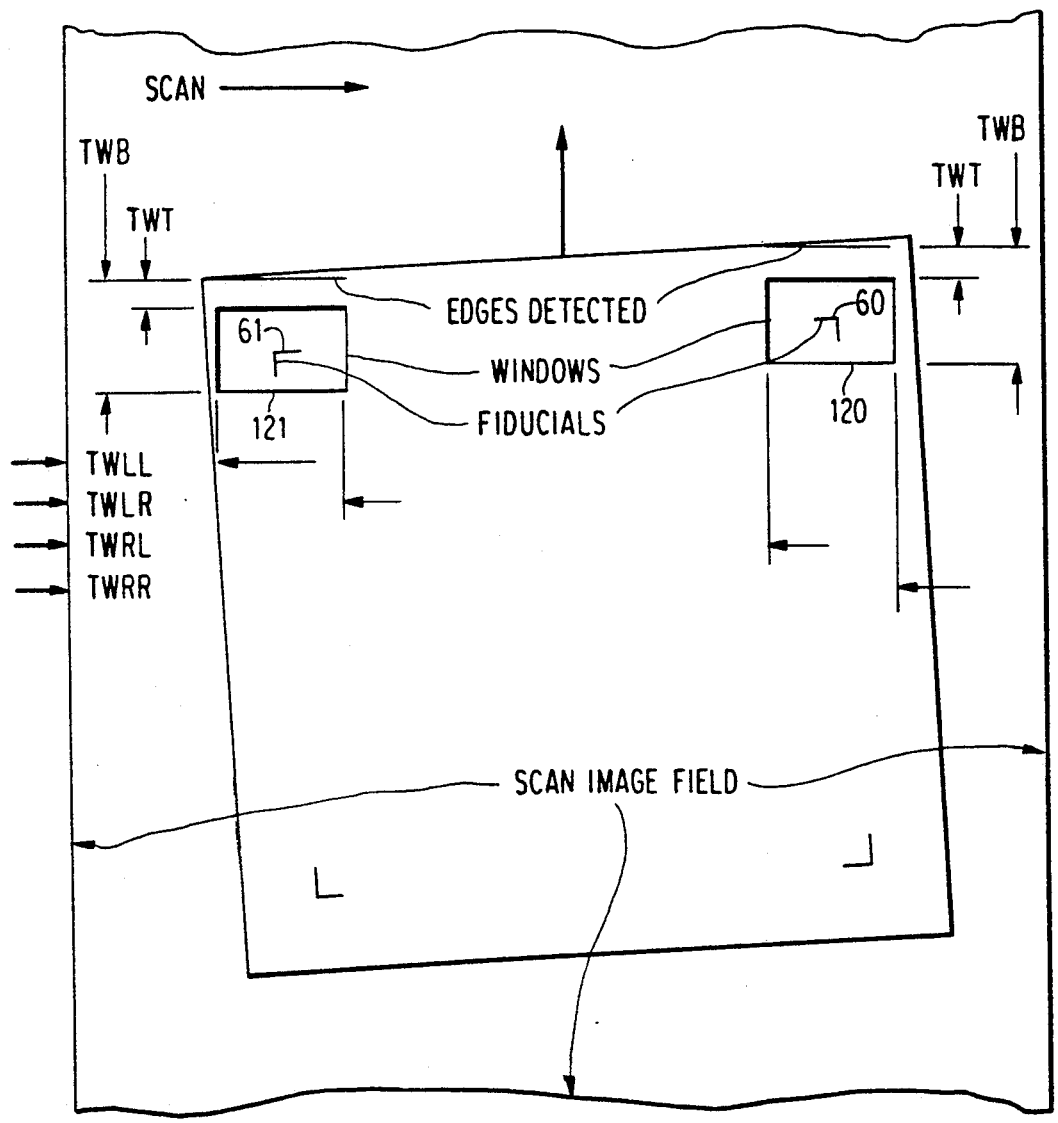
FIG. 24 is an illustration of the scan image field showing the use of windows to find fiducials.

To find the upper left and right scan image fiducials without being affected by extraneous image information, detection of the fiducials is limited to a reasonably wide window of search area. This is illustrated in FIG. 24. Windows 120 and 121 are opened in the preferred embodiment in delayed response to the detection of the product edges in the sheet travel direction and to the start of scan in the direction of camera scan. The horizontal position information is extracted from the post and vertical position information is extracted from the bar.

The correlators are normally used to measure the difference between two images, but can be used to measure an image against a null field. This kind of measurement is used in the fiducial finding mode. These modes generally employ the sensing of a maximum or a plateau of correlation scores, indicative of the image object of interest having completely entered the correlator field. A sequencer (not shown) provides threshold values for comparison with the correlator scores.

Figure 25:
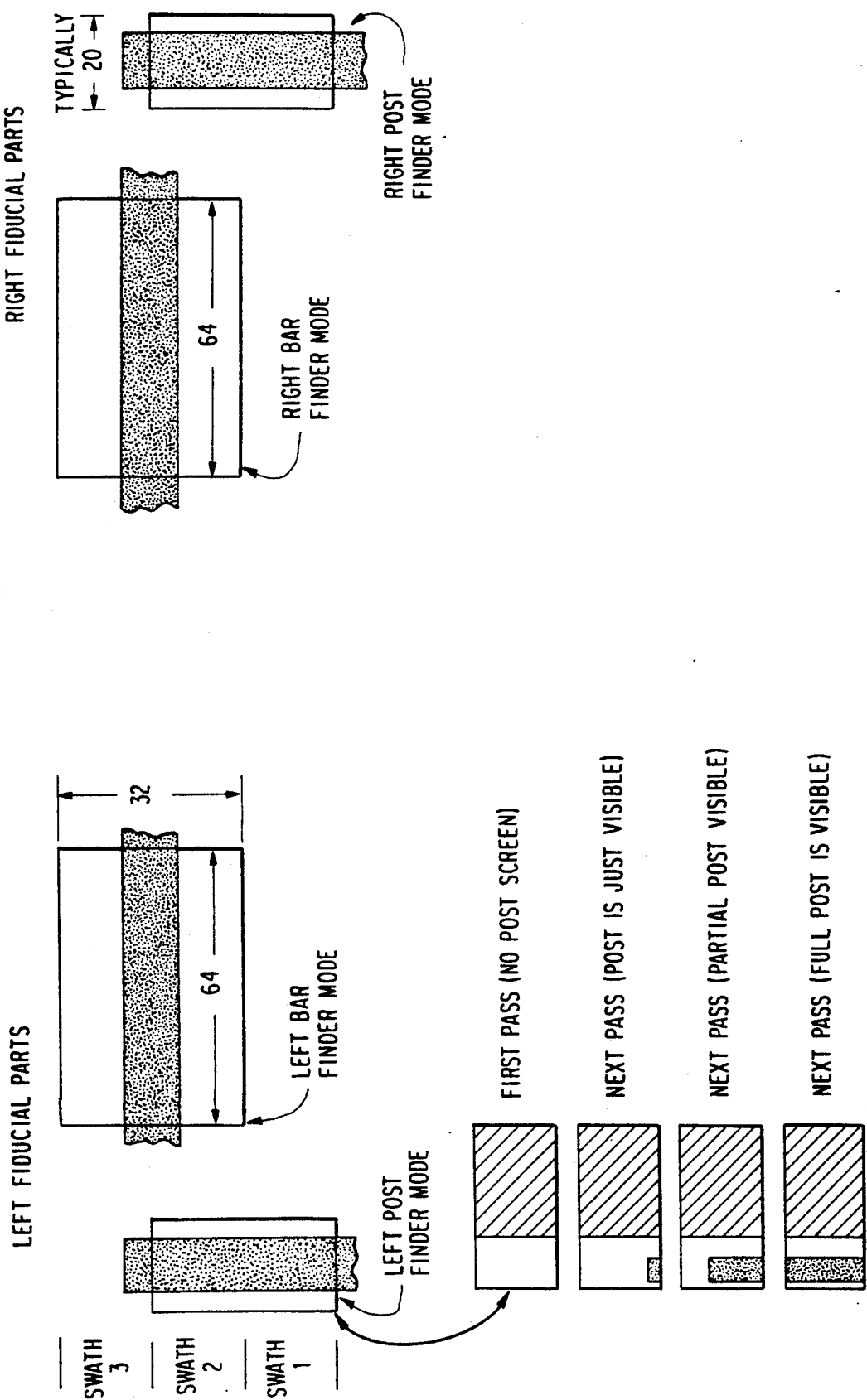
FIG. 25 is a pictorial representation of fiducial parts showing the case of detection of the left fiducial post.

FIG. 25 illustrates how the post and bar image fiducials are measured. The fiducial posts and bars are shown sequentially within the correlators. Logic is employed that will recognize the coincidence of a post and a bar. The full post is found by addressing swaths one and two using the scrolling buffer selector. The example shows the subsequent positions of the post for each swath advance. When the full post is found, the buffer selector address is changed to access swaths two and three for finding the bar.

Use of Splays in Rough Alignment

The images within the five correlators and FIFOs are normally spaced vertically one raster apart giving the finest resolution required for alignment. This is called single splay and is the normal operation of this three stage address scheme. It is possible to give a different set of multiplexer addresses such as in double splay where the image frames entering each of the correlators are spaced two rasters apart. The splay modes are very useful to reduce resolution of the image in order to obtain a correlation measure for a rough alignment.

Figure 26:
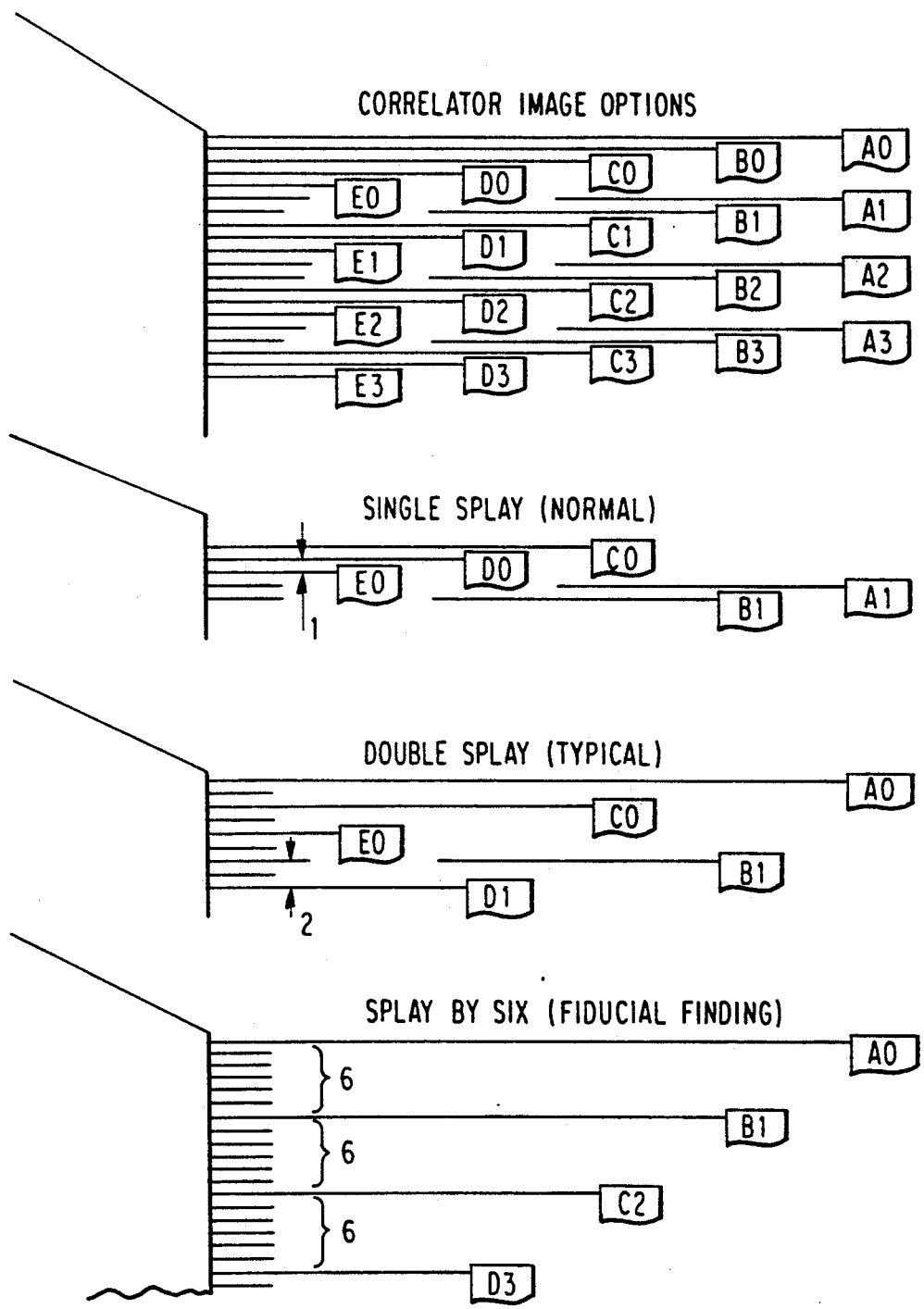
FIG. 26 illustrates several selector addressing patterns for different splays.

FIG. 26 shows various splay alternatives with the topmost raster line entering all of the correlators under different multiplexer addresses. The normal addressing sequence for a central correlator is A0—B0—C0—D0—E0—A1—B1—C1—D1—E1—A2—B2—C2—D2—E2—A3—B3—C3—D3—E3—, where the vertical frame selection sequence would be advanced by one raster. Single and double splays are shown. Also shown is a low resolution splay of six. Because the image scrolls in sixteen pixel swath increments, it is necessary to cover a range of sixteen pixels by the correlators to effect a rough measurement. The splay six mode covers nineteen rasters which are more than adequate. Splay six is used to determine the initial location of the fiducial bar.

History and Indent Map Generation (BRES circuit)

Figure 27:
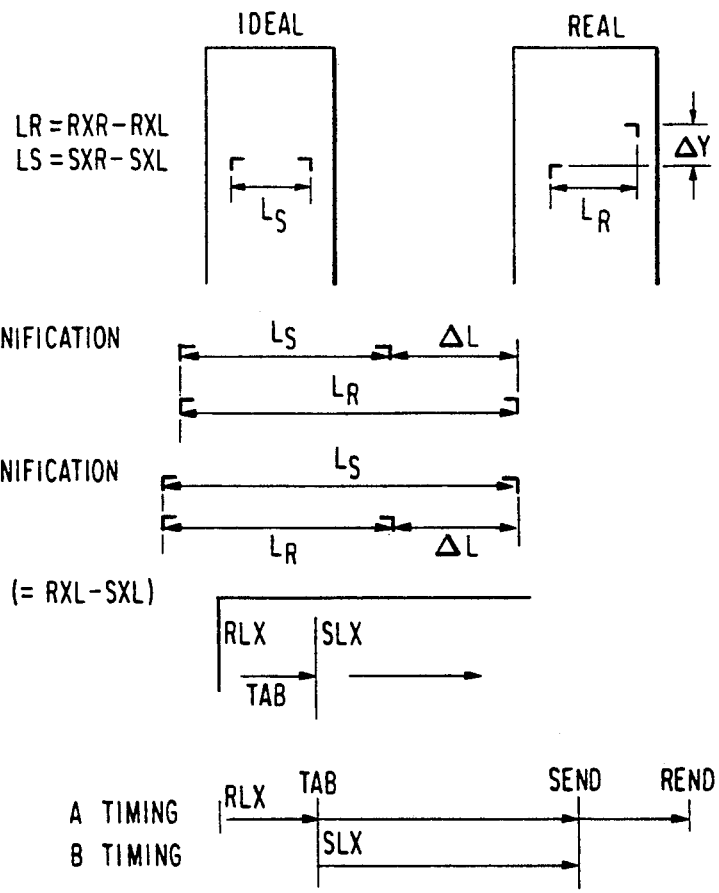
FIG. 27 is a geometrical representation of the various distances measured for detected fiducials.

The geometric relationships between the fiducials as found in the two images are shown in FIG. 27. $L_S$ is defined as the horizontal distance between the left and right fiducials of the ideal image, while $L_R$ is defined as the horizontal distance between the left and right fiducials of the real image. $\Delta Y$ is the number of ideal frame movements required over the span of the raster in order to achieve alignment with real image. For example, if $\Delta Y$ is ten and the number of frames per raster length is eight hundred, then the frame elevation would increase by one pixel every eighty frames.

Likewise, the difference in raster length $\Delta L$ between the real and ideal images is a magnification or minification and is compensated for by gap or overlap between frame selections from the ideal image. For example, if the difference between the real and ideal image length is eight pixels and the number of frames per raster is eight hundred, then there would occur a gap or an overlap between adjacent frames once every one hundred frames.

The ideal image field is made larger than the real image field in order for alignment movement of the real field to be contained within the ideal field. Therefore, the TAB value will always be positive. There will also be right margin of ideal field beyond the scan field edge.

Figure 28:
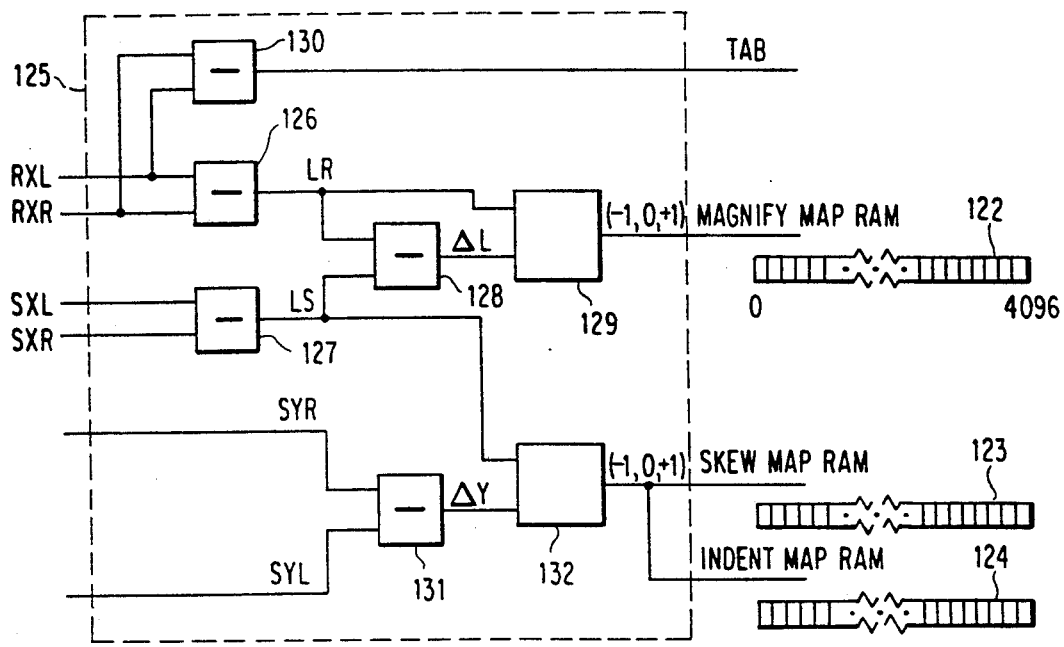
FIG. 28 is a block diagram of the "BRES" generator according to the invention.

These relationships are recognized in the hardware, shown in FIG. 28, which computes the history maps 122, 123 and indent map 124 RAM contents. The computation logic 125 receives as inputs the measured horizontal locations of the left and right fiducial posts of the real image, denoted RXL and RXR, respectively. These are subtracted in subtractor 126 to generate the measured horizontal distance $L_R$ between the fiducials in the real image. Similarly, the measured horizontal locations of the left and right fiducial posts of the ideal image, denoted SXL and SXR, respectively, are input to the computation logic 125. These are subtracted in subtractor 127 to generate the measured horizontal distance $L_S$ between the fiducials in the ideal image. The computed values $L_R$ and $L_S$ are subtracted in a third subtractor 128 to generate $\Delta L$. The computed value of $L_R$ and the sign of $\Delta L$ are used by selector 129 to output $-1$, 0 or $+1$ to the magnify map 122.

The measured values of RXL and SXL are also subtracted in subtractor 130 to generate the TAB output of the computation logic 125.

The computation logic 125 also receives as inputs the measured vertical locations of the left and right fiducial bars of the real image, denoted RYL and RYR, respectively. These are subtracted in subtractor 131 to generate $\Delta Y$. The computed value of $L_S$ and the sign of $\Delta Y$ are used by selector 132 to output $-1$, 0 or $+1$ to the skew and indent maps 123 and 124.

This computation operation is called the "BRES" operation because it is somewhat similar to the Bresenham Algorithm which generates sloping lines in graphic applications. But this operation is different and produces more. For every frame there is computed a skew value and a magnification value, being $-1, 0, +1$ to indicate the movement of the frame with respect to the last frame. There is also computed an indent value to be added to the TAB value for each new swath beginning. The "BRES" circuit produces the $-1, 0, +1$ for entry into the map RAMs.

Figure 29:
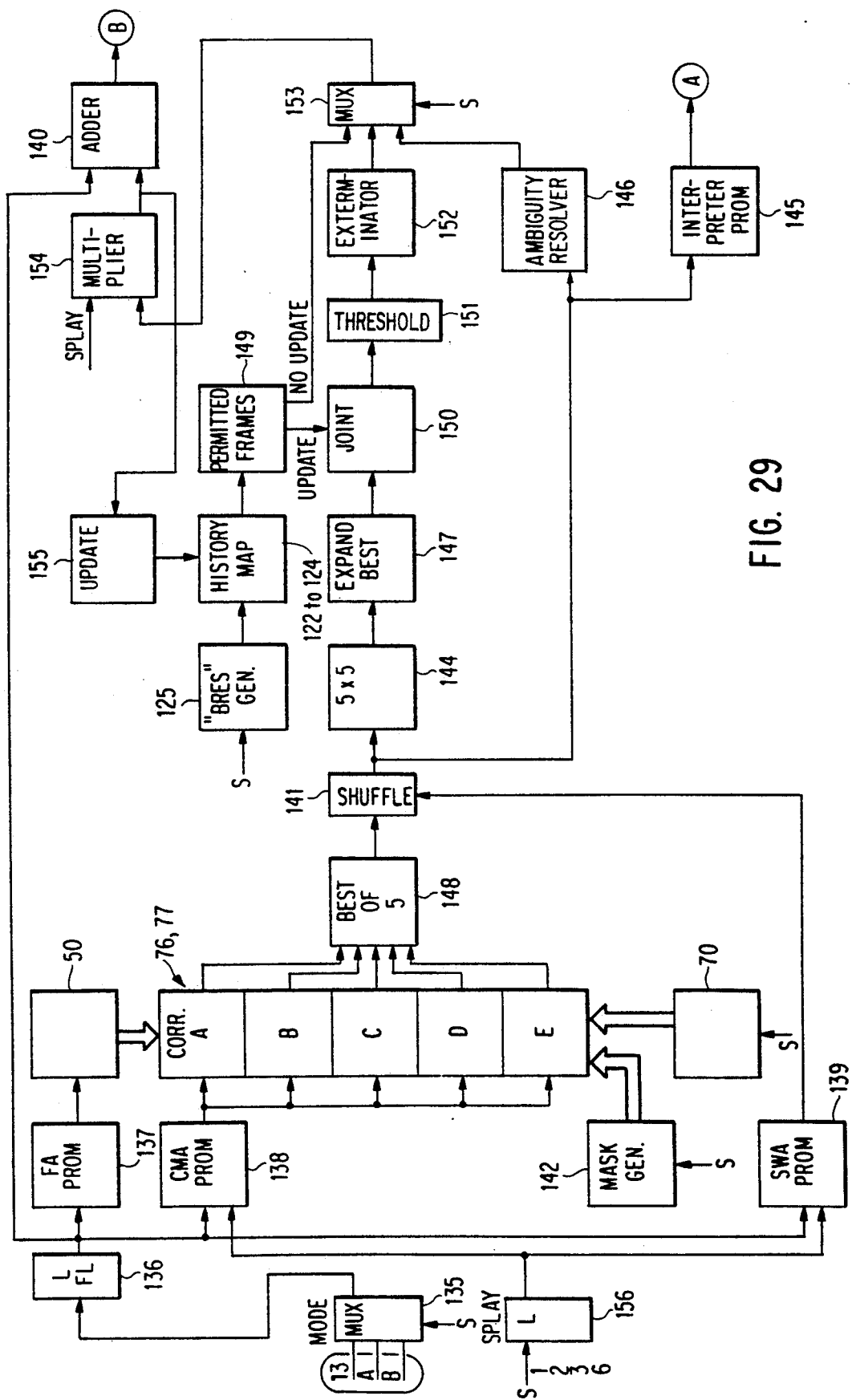
FIG. 29 is a block diagram showing in more detail the control function shown in FIG. 12.

FIG. 29 shows the vertical alignment control circuitry (control function 75 in FIG. 12) in block diagram form. Various combinations of these blocks are used in the sequence of different modes of operation. This circuit comprises a mode selector multiplexer 135 which drives a line number (FL) latch 136 which, in turn, drives the FA PROM 137 (selector address), the CMA PROM 138 (correlator/FIFO multiplexer address), the SNA PROM 139 (shuffle number address), and the FL adder 140. The FA PROM 137 provides the address lines to the ideal buffer selector 50. The CMA PROM 138 provides the address lines to the five correlator/FIFO circuits 76, 77. The SNA PROM 139 provides addresses to the "Shuffle" circuit 141. A correlator mask generator 142 provides a variety of masks to the correlators 76 according to the mode of operation.

The correlator outputs are connected to a "Best of Five" circuit 143 which is connected to the "Shuffle" circuit 141. The "Shuffle" circuit 141 drives a 5×5 matrix 144 containing the array of correlator scores. The "Shuffle" circuit 141 also drives the Interpretation PROM 145 and the ambiguity resolver PROM A 146. The 5×5 matrix drives a "Next Best" generation circuit 147. The BRES generator circuit 125 (FIG. 28) provides initialization data to the history and indent map RAMs 122 to 124 which feeds the "Permitted Frames" circuit 149. The "Permitted Frames" circuit 149 is joined with the expanded best data in the "Joint" circuit 150. The "Joint" circuit 150 output is prioritized in the threshold circuit 151 which feeds the ambiguity resolver PROM B 152. The "Permitted Frames" circuit 149, the ambiguity resolver PROM B 152 and the ambiguity resolver PROM A 146 are multiplexed in a multiplexer 153 which drives a multiplier 154 which, in turn, drives the FL adder 140 and the update circuit 155. The update circuit is used only in the update mode of operation and controls the history and indent maps 122 to 124. The multiplier 154 also receives a splay value from register 156 at its second input. This splay value is also supplied to the CMA PROM 138 and the SNA PROM 139. The interpreter PROM 145 output and the FL adder 140 output are connected as inputs to the mode selector multiplexer 135, as indicated by the connectors "A" and "B", respectively.

The first step is fiducial bar finding. It is started by a sequencer (not shown) commanding the correlators 76 into splay six mode and setting the FL (line number) to thirteen. The result of the correlation operation of the real and ideal bar images is a rough measurement which is interpreted by an "interpreter" PROM 145 which provides a finer FL address at A.

In the next step, the sequencer commands this new address to the correlation circuitry in a splay one mode for finer resolution and adjustments. The ambiguity resolver PROM A 146 arbitrates the ambiguous cases and via the multiplexer 153, the multiplier 154, and FL adder 140, the outuput B is returned to the mode multiplexer 138.

In the next step, the sequencer commands the BRES circuit 125 to initialize the indent and history maps 122 to 124 based upon the found fiducial information.

In the non-update mode, the history map repeatedly drives the permitted frames circuit 149 whose output is fed back via the multiplexer 153, the multiplier 154 and the FL adder 140 to the mode multiplexer 135 which causes the FA and CMA PROMs 137 and 138 to provide new addresses to the FIFO circuits 77.

III. Update Mode of Registration

General

Figure 30:
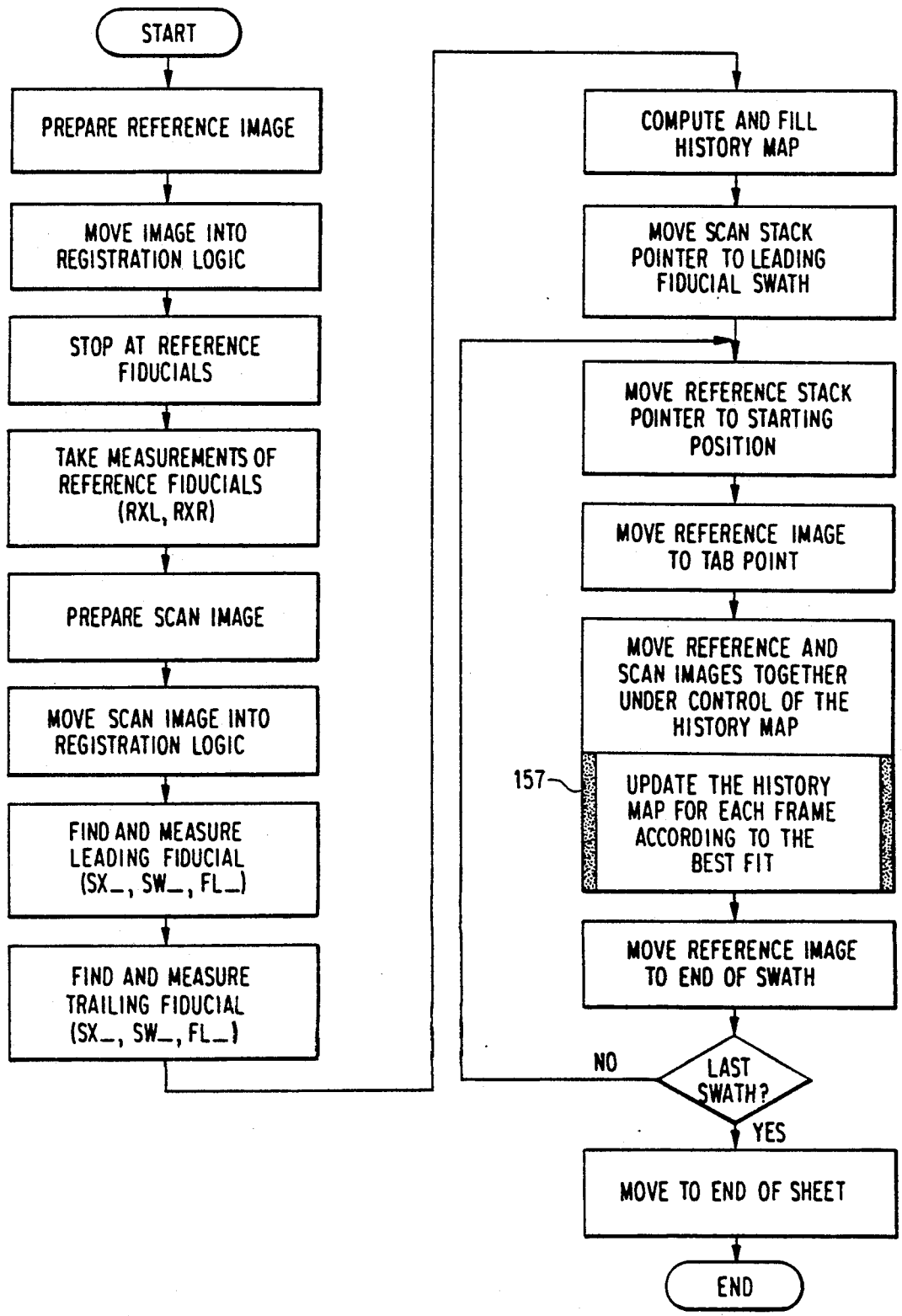
FIG. 30 is a flow chart of the alignment process in the update mode according to the invention.
Figure 31:
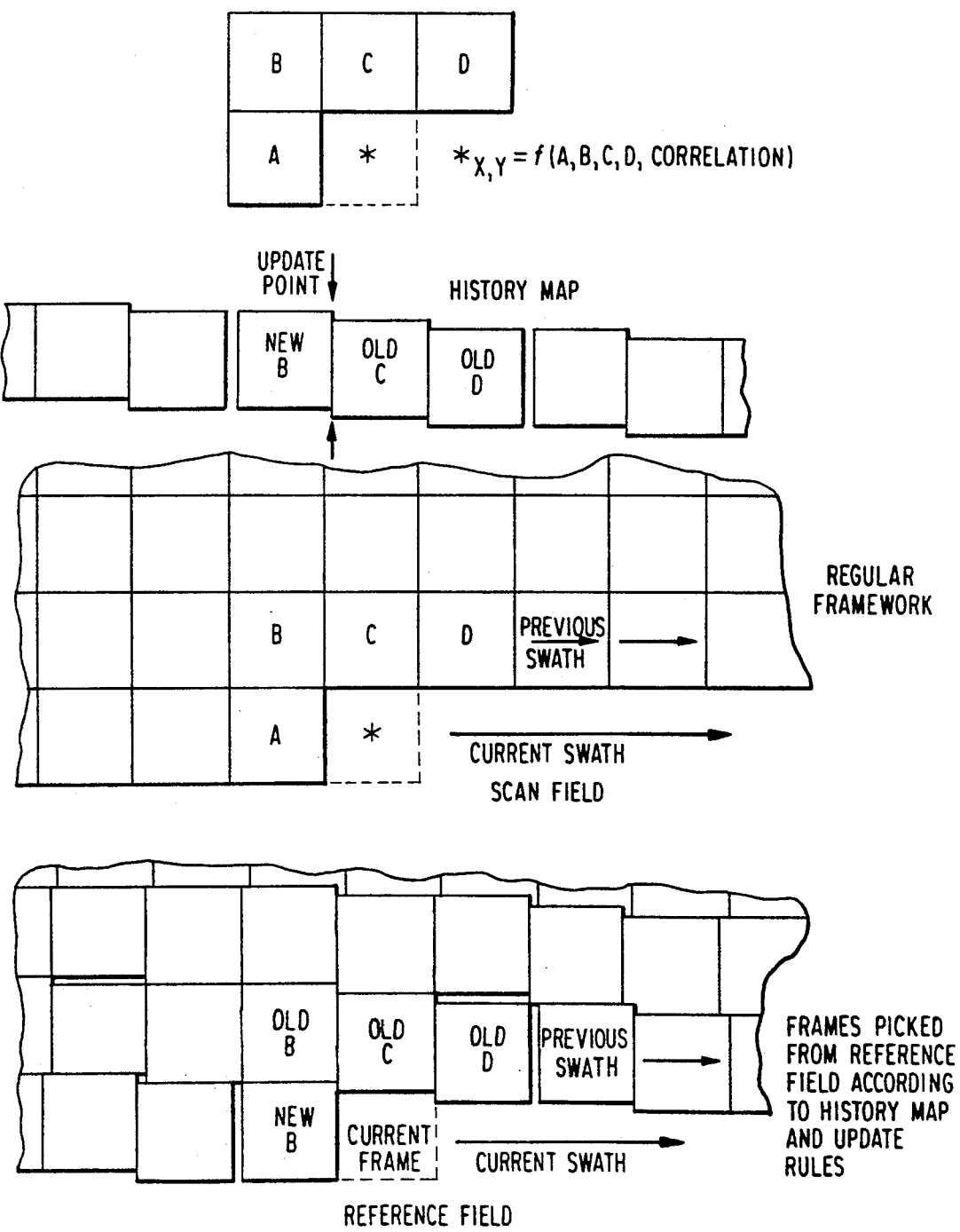
FIG. 31 is an illustration of the update mode field relationships.

The update mode flowchart is shown in FIG. 30. It is quite similar to the non-update flowchart in FIG. 20 with the exception of the update operation 157 added to the controlled movement of the frames. That additional update function requires the indent history maps 122 to 124 to be updated by a complex rule which involves the four contiguous previous frame locations and correlation scores from the five correlators. The framework of the ideal field is not necessarily regular, as illustrated in FIG. 31.

Referring back to FIG. 29, additional functional components are used in the update mode. After initial fiducial finding and history map generation, the correlators 76 are employed to continuously measure the relationship between the ideal and real images. The five correlators feed their scores to a "Best of Five" circuit 143, which determines the best vertical frame. The orientation is maintained by the "Shuffle" circuit 141. These vertical "Best of Five" are compared with subsequent "Best of Five" until a 5×5 matrix 144 of best locations is developed. To extend the range of influences of a best location, the nearest neighbors to the best are also assigned as the next best location. A 3×3 matrix of best locations is extracted. The indent and history maps 122 to 124 feed the "Permissible Frame" circuit 149 which provides a set of allowable frame locations for the assignment of the next frame. The conjunction of the permissible frame locations with the set of best correlation scores generates a set of eighteen 3×3 potential frame location vectors. The eighteen elements of the set are assigned priorities, such that a priority detection circuitry is required to pick the element which is the most strict. Despite the strictness involved, ambiguous results are resolved in an ambiguity resolver circuit. The positional results are multiplied in the multiplier 154 by the splay value of one and added in adder 140 to the current FL number. The FL number is fed back to the mode multiplexer 135 for use in processing the next frame.

3×3 "Best Matched Combinations"

Figure 32:
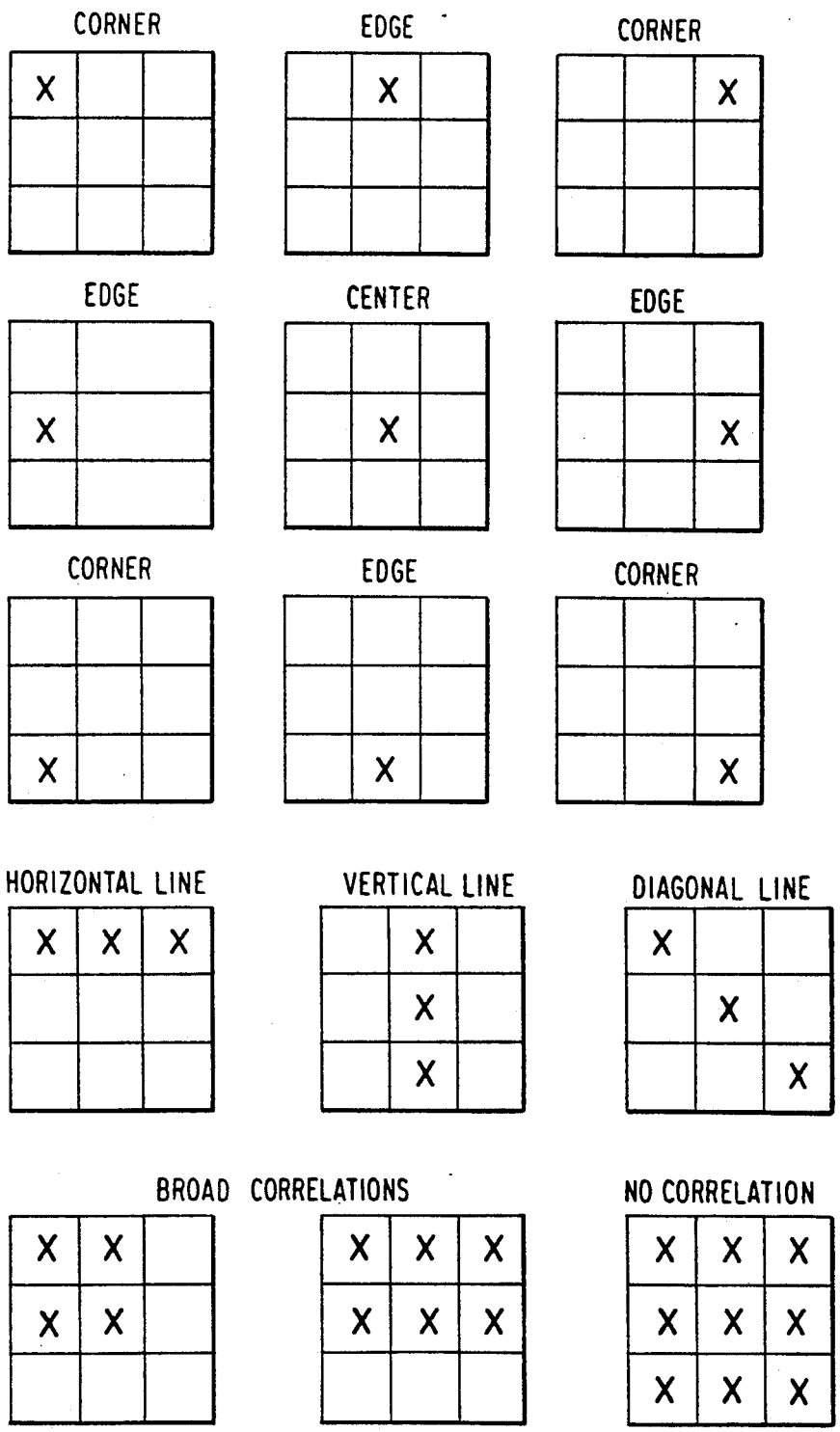
FIG. 32 is an illustration of several of 512 possible best combinations.

There are five hundred twelve possible combinations of 3×3 best frame matches. FIG. 32 shows several of those possible combinations. In the case of only one best match, four of them occur in the matrix corners, four of them occur on the edges and one occurs in the center. A horizontally oriented feature such as a long horizontal line being matched might show itself with a horizontal set of best matched frames. Likewise, a long vertical feature or diagonal feature might show several best matched frames. It is possible for the matching real and ideal image features to be of differing sizes such that broad correlations are found. It is possible that whole areas in the image have no features to match, and the best match is implied to be anywhere.

The reason will be explained later, but there is a need to generate not only the best matched frame information, but also the next best, the next-to-next best, and so forth. There are two ways to do this. One is to successively rank the matrix and generate a series of ranked 3×3 matrices. This method is viable but requires more hardware and/or software than the preferred method. In the preferred method, it is assumed that the next best matrix point is the point that is nearest to the best point. Likewise, the next-to-next best point is nearest to the second best point and so forth.

Figure 33:
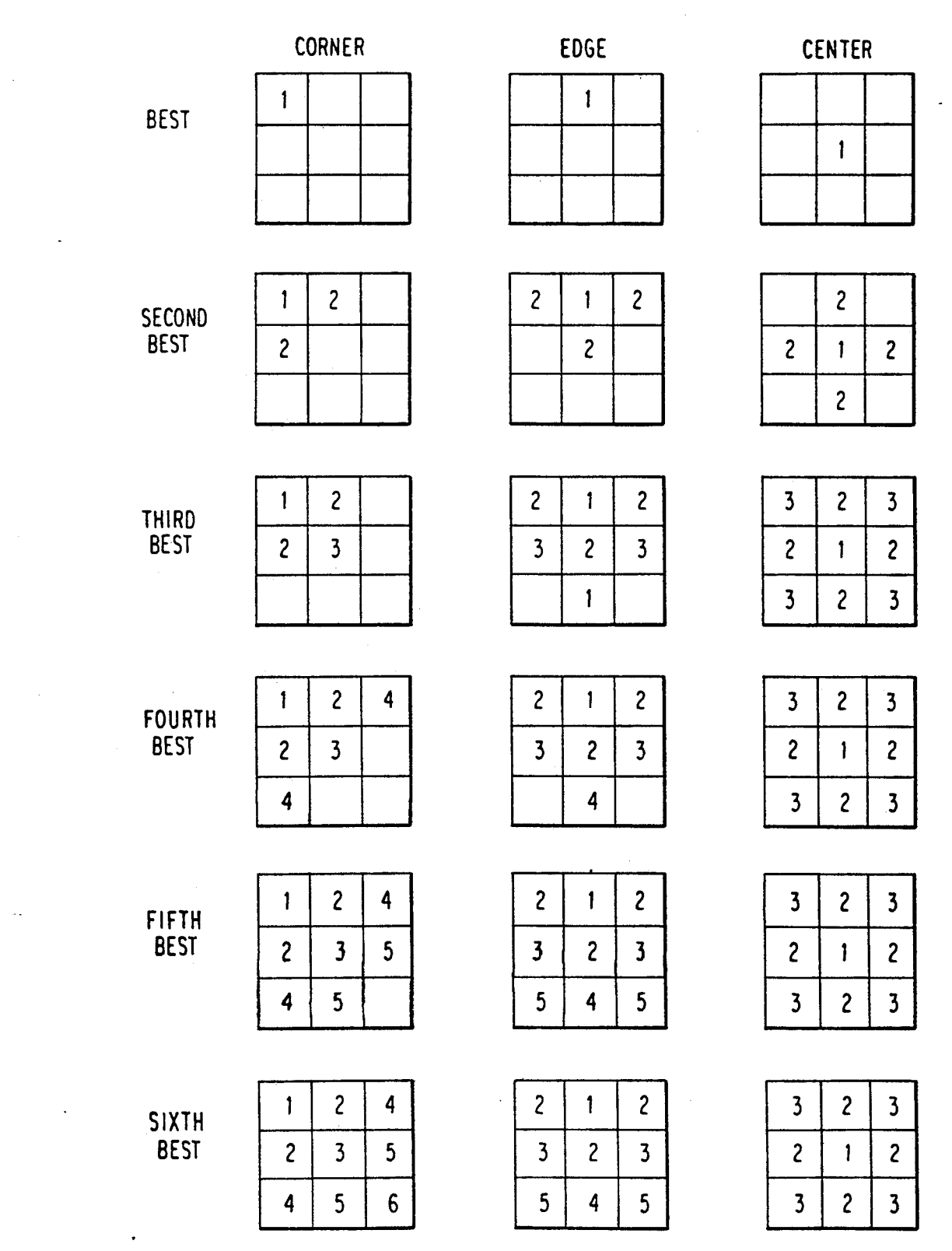
Figure 34:
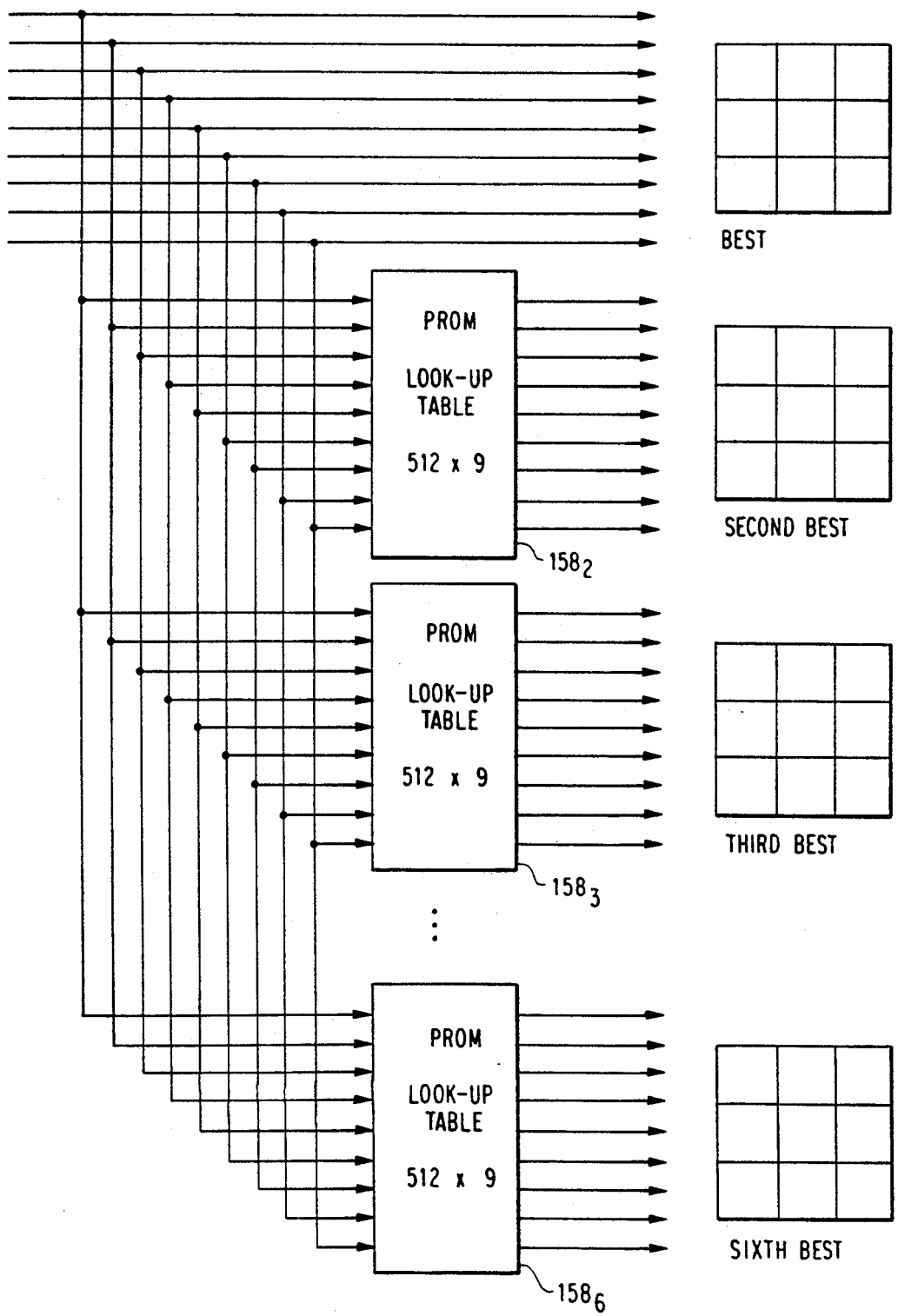
FIG. 34 is a block diagram of PROM lookup tables for generating the best and next best match frame comparison matrices.

FIG. 33 illustrates for three out of the five hundred twelve possible best combinations what the next best (second best), the third best, the fourth best, the fifth best, and the sixth best match frame matrix points would be. The remaining five hundred nine combinations could also be similarly illustrated but are generated for table look-up entries in suitable PROMs $158_2-158_6$ as illustrated in FIG. 34.

Although this scheme uses five comparators to generate the 3×3 matrix, it is possible to use more comparators to generate larger matrices, e.g., 5×5, 7×7, etc., in order to get finer alignment determination over a larger field. Selector hardware and addressing assignment would require appropriate modification.

Frame Selection

The frame or raster segment selection process requires consideration not only of the comparability of the corresponding real and ideal frames as was previously discussed but also of a limit called the frame-to-frame selection rule. FIG. 5B illustrates that the track of frames through the ideal image may cause some mild distortion to the ideal image. This is tolerable because the ideal image is well defined, its features are large enough so they will not lose their topology and, if necessary, could be reconstructed using the alignment control information. However, this distortion is limited by requiring adherence to the frame selection rule.

FIG. 31 shows the relationship between the frames of a real image and the selected frame of an ideal image together with a pictorial representation of the contents of the history map. The "current frame" of the ideal image must be selected to adequately match the "current frame" of the real image. The previously selected ideal image frames and their respective real image frames which are contiguous to the current frame are labeled A, B, C, and D.

Figure 35:
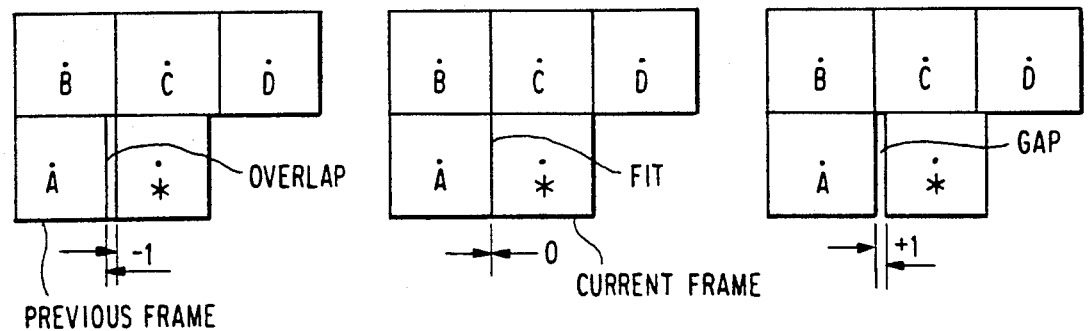
FIG. 35 is an illustration of the horizontal placement of a frame.
Figure 36:
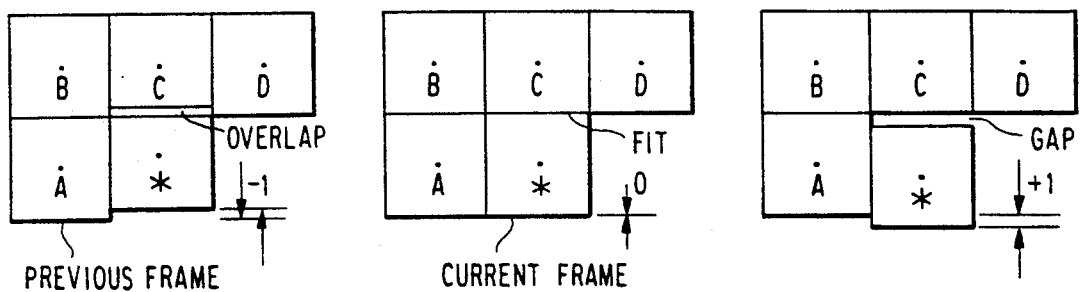
FIG. 36 is an illustration of the vertical placement of a frame.
Figure 37:
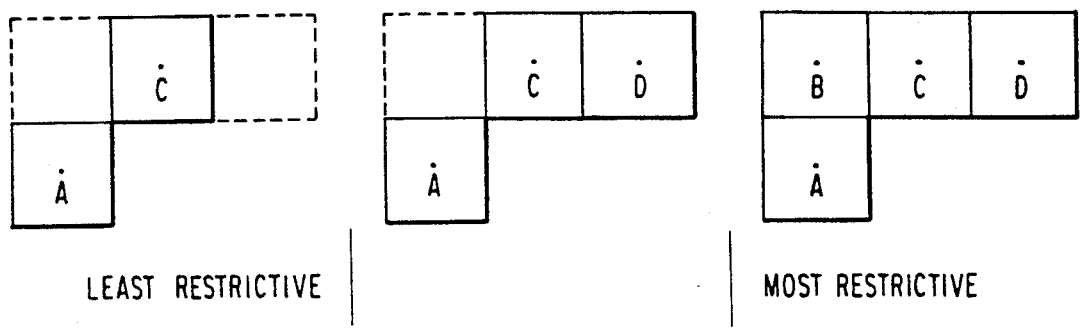
FIG. 37 illustrates relative strictness in the placement of frames.

Nevertheless, a limit is placed upon the selection of ideal image frames. A simple rule is applied to the selection of a frame. Specifically, a selected frame cannot be more than plus or minus one pixel in centrality from any of the previously selected contiguous frames. This is illustrated in FIGS. 35 and 36. This rule may be relaxed to facilitate difficult alignment situations. The current frame may also be aligned within the rule with respect to only frames A, C and D or to only frames A and C as shown in FIG. 37.

Figure 38:
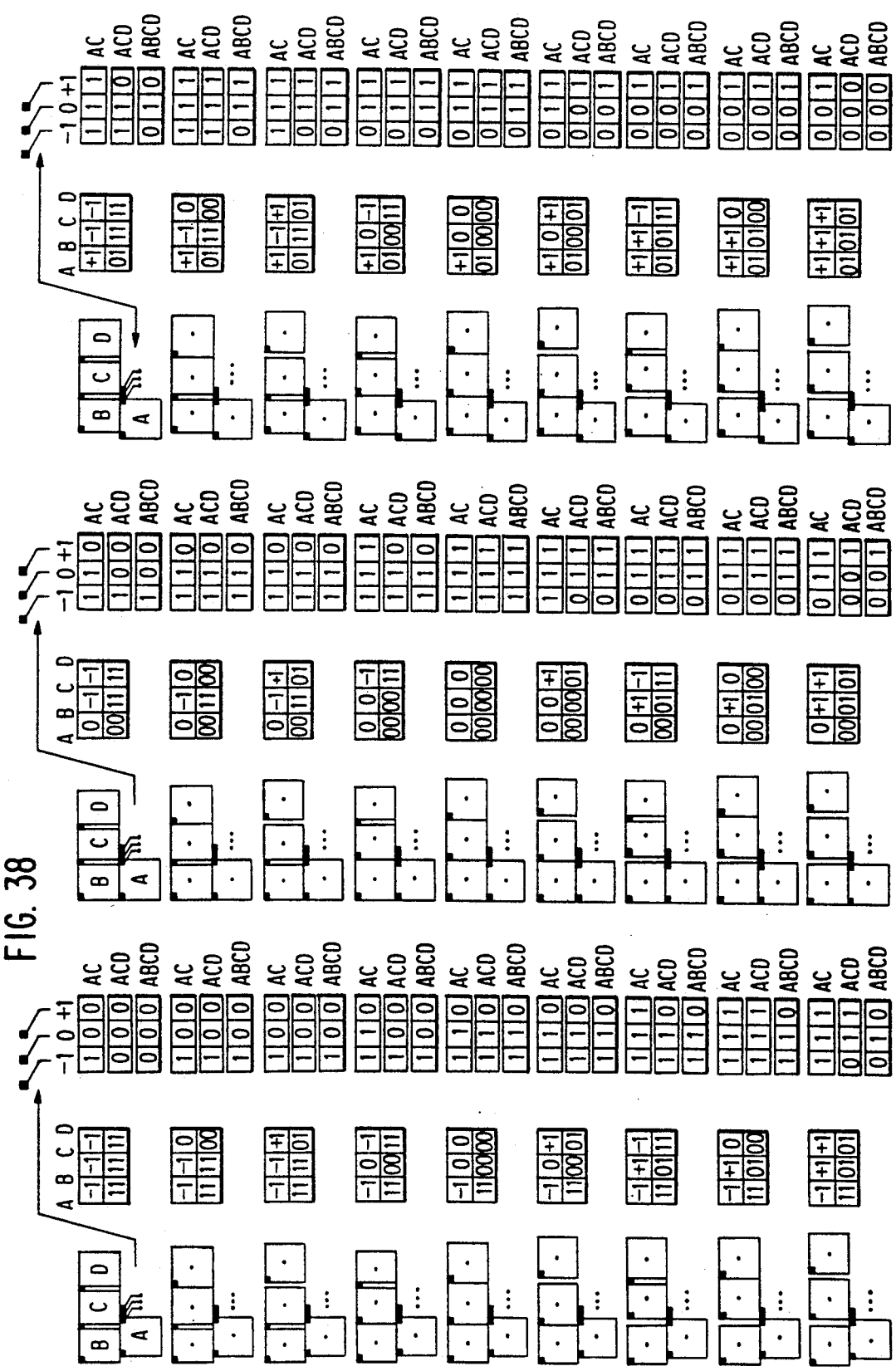
FIG. 38 is like FIG. 35 and in addition illustrates various matrices used in the horizontal placement of frames.

The frame selection rules are illustrated in FIGS. 38 and 39. These figures show horizontal and vertical selections of the current frame with respect to one of twenty-seven combinations each of horizontal and vertical contiguous frame prior selections. In the example, the current frame (with A, B, C, and D abutted without overlap or gap) could be satisfactorily selected from all three horizontal and three vertical positions. For each horizontal or vertical prior selection combination, there are three possible positions the current frame might be allowed to take. They are left, center and right for the horizontal, and up, center and down for the vertical. The particular combination itemizes the allowed positions for the three contiguous frame cases (ABCD, ACD, AC).

The horizontal and vertical sets of permissible frame locations are joined to form the combinations as shown by examples in FIG. 40. Although there are nine matrix combinations possible, the preferred circuit is limited to the three which have the same horizontal and vertical strictness. These matrices are ordered in priority of strictness to following the selection rule. The most strict is the matrix generated by ABCD case and the least strict is the AC case. These permissible frame location matrices locate current frame positions, with respect to frame A, possible within the one pixel limitation, which are permissible, given the selected locations of frames B, C, and D.

The object is to use the most strict selection matrix which would allow any selection and to provide guidance for ambiguity resolution through application of the best matched frame or the series of next best matched frame comparisons.

Frame Selection and Frame Comparison

Figure 41:
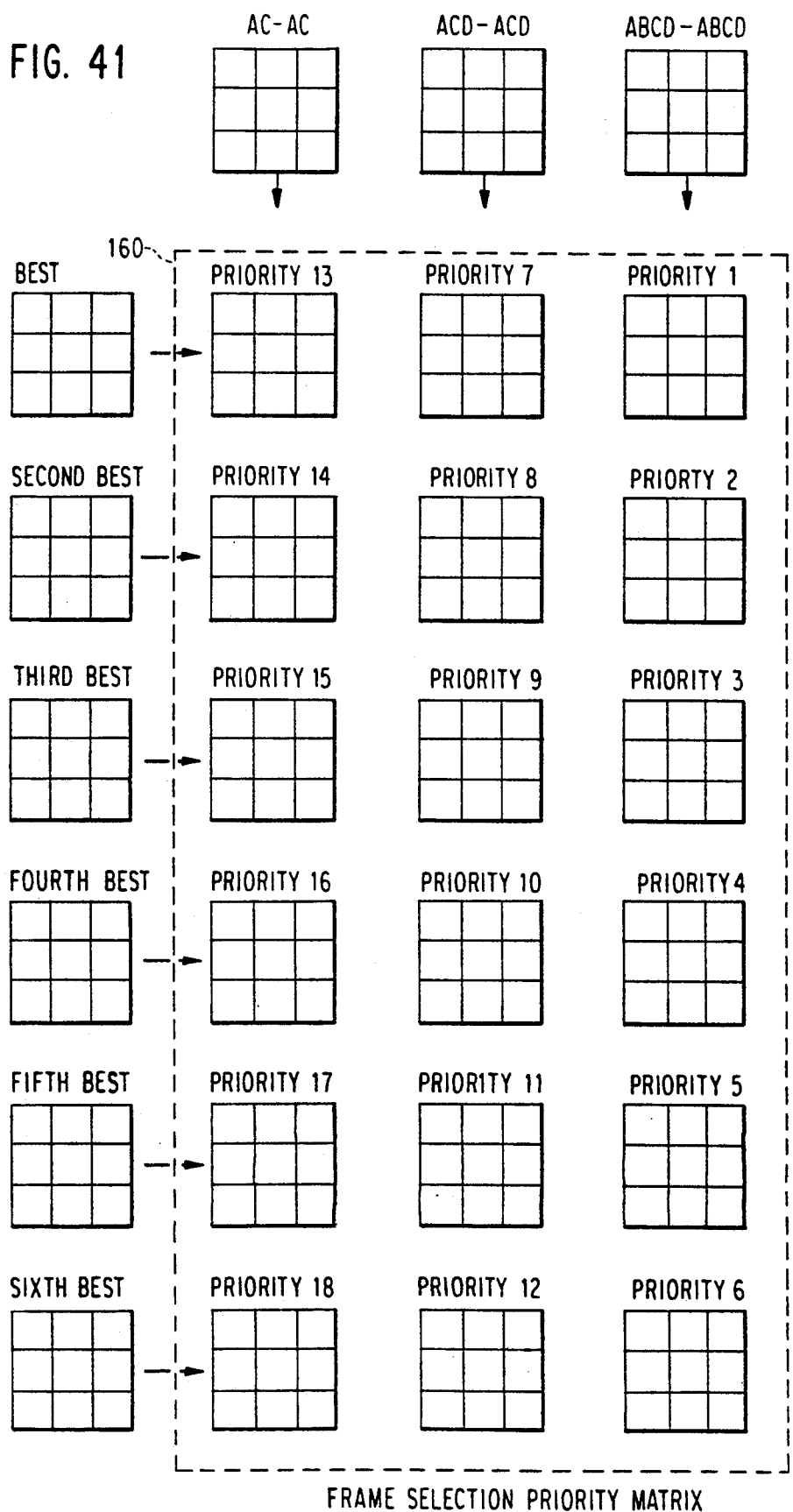
FIG. 41 is an illustration of the frame selection priority matrix.

In this embodiment, the joint of all the possible frame selection matrices, FIG. 40, and the best matched frame matrix series, FIG. 33, is a set of priority matrices 160 shown in FIG. 41. Each ABCD selection matrix element is ANDed with the same element of each of the best matched and next best matched frame matrices. Similarly, each ACD and AC selection matrix elements are respectively joined to the series of best and next-best matched frame matrix elements. The joining of three selection matrices with six best and next best matrices produces eighteen matrices which have been ranked in a priority scheme.

The highest priority is given to the matrix which requires selection with respect to A, B, C, and D and uses the best match frame comparison matrix data. The lowest priority is given the matrix which allows selection with respect to only A and C and uses the least best (sixth best) match frame matrix data.

Figure 42:
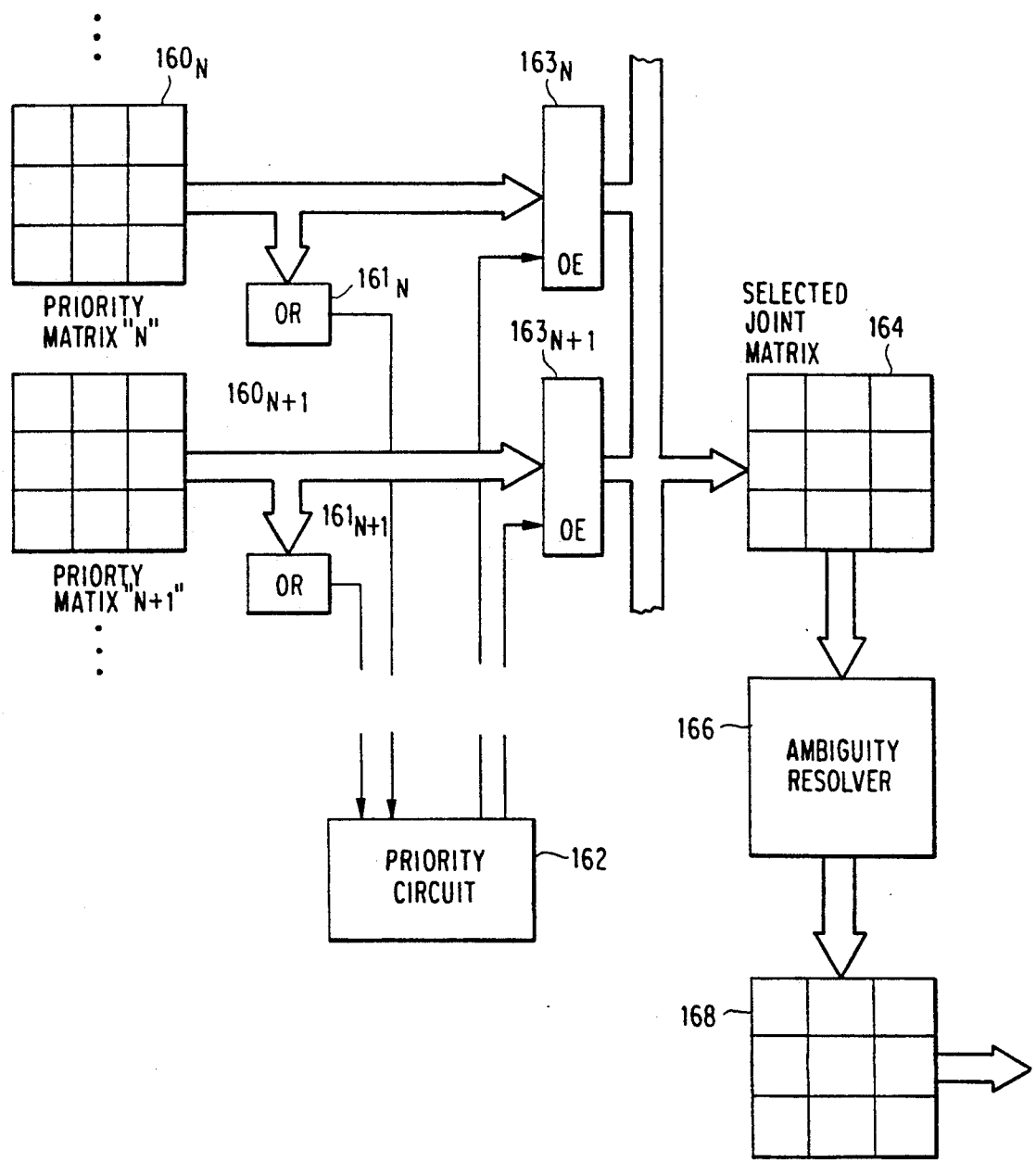
FIG. 42 is a block diagram of the circuitry associated with the priority selection circuit.

FIG. 42 illustrates such a circuit in which all elements of each matrix $160_i$ are ORed by respective OR networks $161_i$ to indicate that a matrix is active with information. Each of the eighteen matrix active lines are inputs to a priority circuit 162. The priority circuit 162 returns one active line out of eighteen to exclusive OR network $163_i$ which causes that entire matrix to be gated as the selected joint matrix 164 to the ambiguity resolver PROM 166.

The ambiguity resolver PROM 166 contents are created by any applicable rule such that all 512 possible combinations that could occur are covered. The rule applied in this embodiment is based on the centroid of the contents of the matrix. The output of ambiguity resolver PROM 166 is the resolved joint matrix 168.

Review of Update Mode Control

Figure 43:
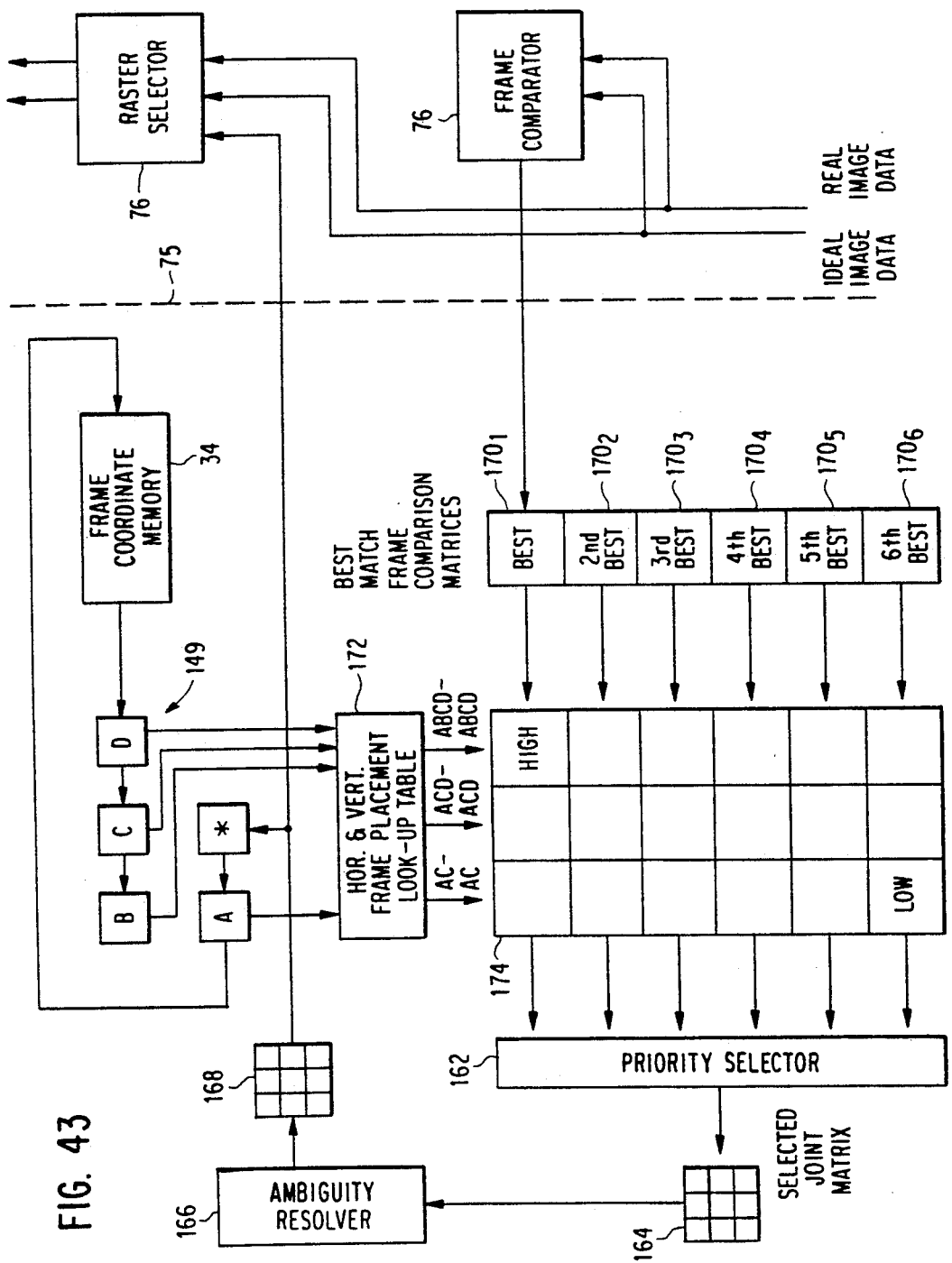
FIG. 43 is a functional block diagram illustrating the control loop in the update mode of operation.

The functional block diagram in FIG. 43 summarizes the loop of this control system. It shows that frame comparators 76 feed information to the best and next best generators $170_1$ to $170_6$, providing comparison matrices. The frame coordinate memory 34 provides the prior frame selections to the permitted frame selection circuitry 149 which provides three matrices 172 that are joined with the comparison matrices to form the priority matrices 174. The priority matrices 174 drive a priority selector 162 which selects a highest priority joint matrix 164. Ambiguities in the selected matrix 164 are resolved by ambiguity resolver 166, and a single element point is output to matrix 168 which is then stored in the ABCD registers and eventually stored in the frame coordinate memory 34.

The recorded ideal frame coordinates can be of several forms. They can be the absolute ideal scrolling buffer clock counts and the multiplexer addresses. They can be in difference form recording only the difference from the nominal position with respect to frame A. The simpler preferred embodiment records the differences.

IV. Enhancements to the Preferred Embodiment

Images contain different densities of features of various sizes and shapes which can affect the alignment process. Features may be so large that the frame comparison function cannot contain them to make a frame selection. Only the feature edges would be available for comparison purposes. However, the real image feature edges may not be in conformance with the ideal image feature edges, as would be the case of attempting to align slightly different size features. Extracting or generating smaller fiducials from the large features precludes modification of the alignment hardware. Certain features may be more desirable to use for alignment purposes. Finer geometry features requiring the tightest alignment tolerances would serve better for frame comparisons.

A set of devices called fiducial generators or extractors provides a means of generating fiducials from selected features or extracting desired features out of the fields of ideal and real images, through product specific morphological image processing.

The range of features or fiducials possibly extracted or generated is large. Some examples of extracted or generated fiducials include: reducing a large feature to its center, reducing it to a concentric smaller feature, creating a centered grid throughout the field of the large feature, finding the centerline of a space between two large features, and extracting only the smaller features.

Figure 44:
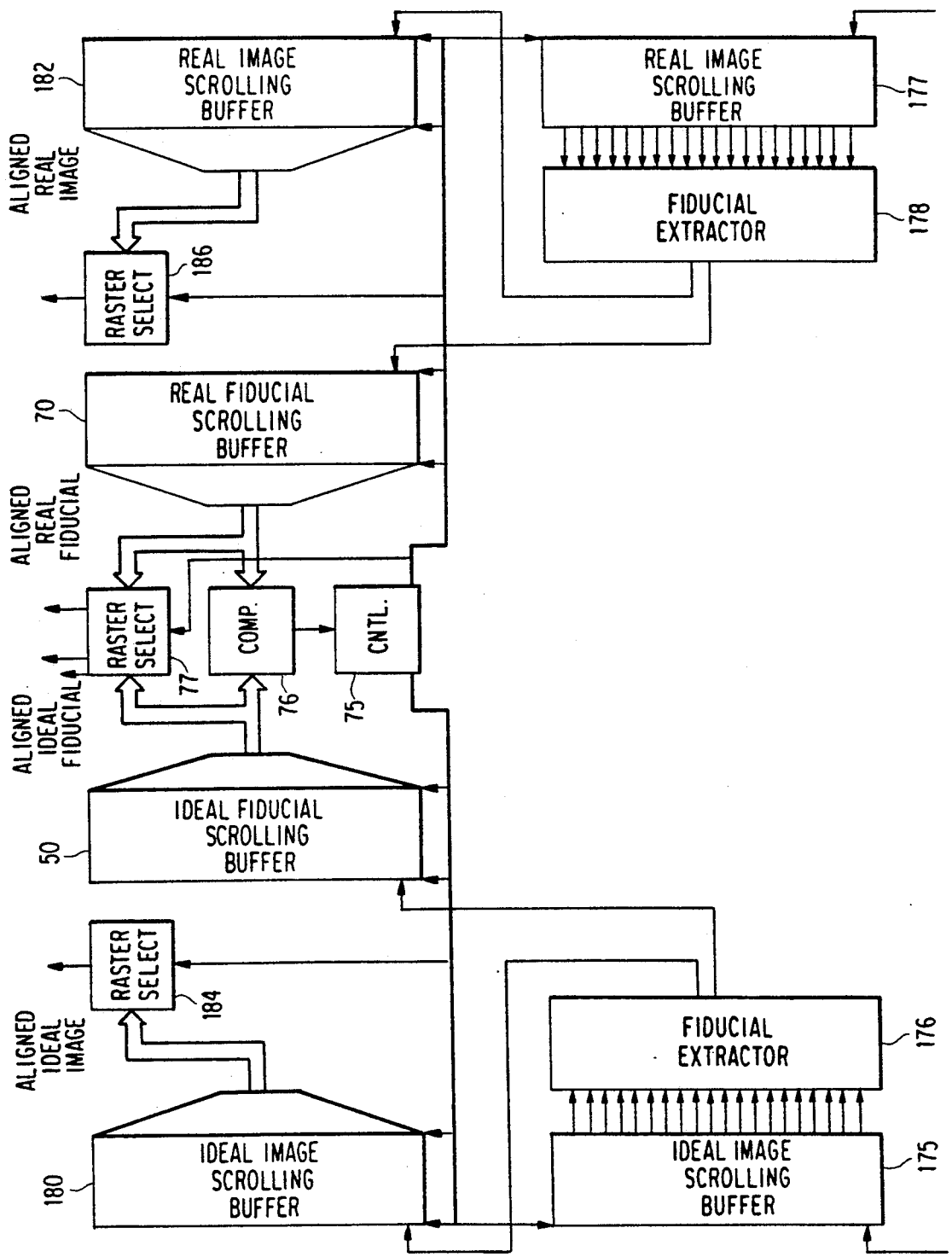
FIG. 44 is a block diagram showing an image alignment system incorporating fiducial extracting circuitry.

FIG. 44 illustrates an alignment system which employs the basic alignment system together with fiducial generation circuitry. A scrolling buffer 175 feeds the morphological transformation function 176 which generates a first output which is a raster of a transformed image containing the desired fiducial in the ideal image. A similar scrolling buffer 177 feeds the morphological transformation function 178 which generates a first output which is a raster of a transformed image containing the desired fiducial in the real image. The size of the fiducial generators together with their driving scrolling buffers is dependent on the size of the largest feature to be transformed.

Extracted or generated fiducials from extractors 176 and 178 flow through the basic alignment buffer set comprising scrolling buffers 50 and 70 (see FIG. 12), and the original images flow from extractors 176 and 178 through an adjunct set of buffers 180 and 182, respectively. The buffers 180 and 182 are simultaneously and identically controlled with buffers 50 and 70, respectively, by control function 75. In this manner extracted fiducials control the alignment of original image fields. Simultaneously and in spatial alignment, the ideal and real images are scrolled up their respective but separate buffers. The aligned rasters are taken from their respective but separate raster selection circuits 184 and 186.

Recognizing the ability for extracted fiducial fields to simultaneously align real and ideal binary image fields, it is a small extension to be able to provide for the simultaneous alignment of an original multi-bit grey scale real image with a binary ideal image. It is also possible to align the real image to a multi-bit (grey scale, color, or multi-layered) ideal image.

An application for this extension is the aligning multi-layered ideal image data to inspection real grey scale image such that the ideal data can be used to control the thresholding of the real data. Grey scale data is binarized and flows into the real fiducial generator which feeds the basic alignment circuit. Grey scale real data is delayed before flowing into the adjunct grey scale buffer/selector. Multibit ideal image data is bit selected and flows into the ideal fiducial generator which feeds the basic alignment circuit. Ideal multibit data is delayed before flowing into the adjunct multibit buffer/selector. The alignment circuit in addition to its own control needs provides adjunct timing signals to the adjunct buffer/selectors and the fiducial generator buffers. The aligned ideal and real image frames flow out of the selectors for downstream processing as well as feeding a reference controlled segmentation circuit which provides a third downstream output.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. An electronic image alignment apparatus which electronically registers ideal image raster data to real image raster data for subsequent processing comprising:
   first and second input means for respectively receiving rasterized binary ideal and real image data streams;
   first and second scrolling buffers respectively receiving said rasterized ideal and real image data streams, said scrolling buffers being wide enough to hold the width of an image and high enough to hold a skewed image to account for misalignment or distortion;
   first and second selector means respectively connected to said first and second scrolling buffers for randomly accessing sets of contiguous image rasters in a vertical direction, each scrolling buffer image swath raster set being moved horizontally of a lower swath and into a new position in an adjacent upper swath, horizontal movement of each scrolling buffer being independent such that adjustable sequential access by said first and second selector means in the horizontal direction is available; and
   control means for generating addresses to said first and second selector means and clock signals to said first and second scrolling buffers, real image data stream addressing being held fixed and real image data stream clocking being held constant during a registration phase while ideal image data stream addressing and clocking are varied to align said ideal image raster data to said real image raster data.

2. The electronic image alignment apparatus recited in claim 1 further comprising means for scanning an object to generate a rasterized real image data stream, said means for scanning being connected to said second input means.

3. The electronic image alignment apparatus recited in claim 2 further comprising:
   database means for storing ideal object data; and
   raster generator means connected to said database means for accessing said ideal object data and generating a rasterized ideal image data stream, said raster generator means being connected to said first input means.

4. The electronic image alignment apparatus recited in claim 2 further comprising second means for scanning an ideal golden part to generate a rasterized ideal image data stream, said second means for scanning being connected to said first input means.

5. The electronic image alignment apparatus recited in claim 1 wherein said first and second input means each receive a single raster image data stream and said first and second scrolling buffer swath size are each one raster in width.

6. The electronic image alignment apparatus recited in claim 1 wherein said first and second input means each receive multiple adjacent raster image data streams and said first and second scrolling buffer swath sizes are a multiple of one raster in width.

7. The electronic image alignment apparatus recited in claim 1 wherein said first selector means provides a multiple of vertically selected sets of rasters of said ideal image data stream, each set being disposed a fixed number of rasters from an adjacent set.

8. The electronic image alignment apparatus recited in claim 7 wherein said second selector means provides a single vertically selected set of raster of said real image data stream, said set being selected at swath intervals.

9. The electronic image alignment apparatus recited in claim 7 wherein said first selector means comprises:
   first, second and third stages, said first stage providing one vertical set of contiguous rasters where selection is made in advances of a predetermined number of rasters, said second stage providing a predetermined number of sets of contiguous rasters, each set being disposed a fixed number of rasters apart; and
   a plurality of first-in, first-out buffer means, equal in number to said predetermined number of sets of contiguous rasters, for receiving and temporarily storing a corresponding one of said contiguous rasters from said second stage, said third stage selecting an output of one of said first-in, first-out buffer means.

10. The electronic image alignment apparatus recited in claim 9 wherein said second selector means provides a single vertically selected set of raster of said real image data stream, said set being selected at swath intervals, and said second selector means comprises:
    a single stage providing one contiguous set of rasters as an output; and
    single first-in, first-out buffer means for receiving and temporarily storing said single stage output, an output of said first-in, first-out buffer means being an output of said second selector means.

11. The electronic image alignment apparatus recited in claim 1 wherein said control means comprises:
    first and second timing circuit means for generating said respective clock signals to said first and second scrolling buffers;
    first and second address generator means for generating respective addresses to said first and second selector means; and
    means for comparing images read out of said first and second scrolling buffers to adjust said first timing circuit means with respect to said second timing circuit means and modifying an address to said first selector means.

12. The electronic image alignment apparatus recited in claim 11 wherein said first selector means provides a multiple of vertically selected sets of rasters of said ideal image data stream, each set being disposed a fixed number of rasters from an adjacent set, and wherein said means for comparing images comprises:
   a plurality of frame comparator means, each receiving a respective one of said sets of rasters from said first selector means and common set of rasters from said second selector means, said frame comparator means generating an output for modifying an address to said first selector means.

13. The electronic image alignment apparatus recited in claim 12 wherein said means for comparing images further comprises:
   best match frame comparison matrix means connected to said plurality of frame comparator means for ordering frame comparisons according to a best match between said ideal image data and said real image data;
   horizontal and vertical frame placement lookup table means for ordering placements of frames according to varying degrees of strictness;
   frame selection priority matrix means for joining outputs of said best match frame comparison matrix means and said horizontal and vertical frame placement lookup means as joint matrices in an ordered priority;
   priority selector means for selecting a single joint matrix from said frame selection priority matrix means; and
   arithmetic means responsive to said selected single joint matrix for computing addresses for said first selector means.

14. The electronic image alignment apparatus recited in claim 13 further comprising history map means for addressing said horizontal and vertical frame placement lookup table.

15. The electronic image alignment apparatus recited in claim 14 further comprising means responsive to said selected joint matrix for updating said history map means.

16. The electronic image alignment apparatus recited in claim 1 further comprising:
   first and second fiducial extracting means respectively connected to said first and second input means for extracting rasterized images of fiducial markings in said ideal and real image data stream;
   third and fourth scrolling buffers respectively receiving said rasterized images of fiducial markings in said ideal and real image data streams; and
   third and fourth selector means respectively connected to said third and fourth scrolling buffers for randomly accessing sets of contiguous image rasters in a vertical direction, each scrolling buffer image swath raster set being moved horizontally of a lower swath and into a new position in an adjacent upper swath, horizontal movement of each scrolling buffer being independent such that adjustable sequential access by said first and second selector means in the horizontal direction is available;
   said control means synchronously controlling said first and third and said second and fourth scrolling buffers and selector means to align said ideal image data with said real image data with the alignment of rasterized images of fiducial markings in said ideal and real image data streams.

17. A method of electronic image alignment which electronically registers ideal raster data to real raster data for subsequent processing, said method comprising steps of:
   receiving rasterized binary ideal and real image data streams;
   inputting said rasterized ideal and real image data streams in first and second scrolling buffers, respectively, said scrolling buffers being wide enough to hold the width of the image and high enough to hold a skewed image to account for misalignment or distortion;
   randomly accessing from said first and second scrolling buffers sets of contiguous image rasters in a vertical direction, each scrolling buffer image swath raster set being moved horizontally of a lower swath and into a new position in an adjacent upper swath, horizontal movement of each scrolling buffer being independent such that adjustable sequential access by said first and second selector means in the horizontal direction is available;
   generating a history map based on a measurement of fiducials in said ideal and real image data streams; and
   generating addresses based on contents of said history map for accessing said sets of contiguous image rasters from said first and second scrolling buffers and clock signals to said first and second scrolling buffers and to said first and second input means, the real image data stream addressing being held fixed and the real image data stream clocking being held constant during a registration phase, while the ideal image stream addressing and clocking are varied to align said ideal image raster data to said real image raster data.

18. The method of electronic image alignment recited in claim 17 further comprising the steps of:
   comparing multiple vertically and horizontally selected sets of rasters of said ideal image data stream with a selected set of rasters of said real image data stream; and
   determining a best match of one of said sets of rasters of said ideal image data stream with said selected set of rasters of said real image data stream.

19. The method of electronic image alignment recited in claim 18 further comprising the step of updating said history map according to said best match.

* * * * *